US010477199B2

(12) United States Patent
Bowler et al.

(10) Patent No.: US 10,477,199 B2
(45) Date of Patent: Nov. 12, 2019

(54) METHOD FOR IDENTIFYING AND PRIORITIZING FAULT LOCATION IN A CABLE PLANT

(71) Applicant: General Instrument Corporation, Horsham, PA (US)

(72) Inventors: David B Bowler, Stow, MA (US); Brian M Basile, Lancaster, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 1352 days.

(21) Appl. No.: 13/844,523

(22) Filed: Mar. 15, 2013

(65) Prior Publication Data

US 2014/0267788 A1 Sep. 18, 2014

(51) Int. Cl.
H04N 17/00 (2006.01)
H04L 12/24 (2006.01)
H04N 7/10 (2006.01)

(52) U.S. Cl.
CPC ......... *H04N 17/00* (2013.01); *H04L 41/0677* (2013.01); *H04L 41/12* (2013.01); *H04N 7/10* (2013.01); *H04N 17/004* (2013.01); *H04L 41/22* (2013.01)

(58) Field of Classification Search
CPC ........ H04N 17/00; H04N 17/004; H04N 7/10; H04L 41/0627; H04L 41/0631; H04L 41/0677; H04L 41/12; H04L 41/22
USPC ........... 348/192; 709/223–262; 370/241–253
See application file for complete search history.

(56) References Cited

U.S. PATENT DOCUMENTS

| | | | |
|---|---|---|---|
| 3,838,221 A | 9/1974 | Schmidt et al. |
| 4,245,342 A | 1/1981 | Entenman et al. |
| 4,385,392 A | 5/1983 | Angell et al. |
| 4,811,360 A | 3/1989 | Potter |
| 4,999,787 A | 3/1991 | McNally et al. |
| 5,197,064 A | 3/1993 | Chao et al. |

(Continued)

FOREIGN PATENT DOCUMENTS

| | | |
|---|---|---|
| DE | 69631420 T2 | 12/2004 |
| EP | 1235402 A2 | 8/2002 |

(Continued)

OTHER PUBLICATIONS

Maintenance Using Pre-Equalization, DOCSIS Best Practices and Guidelines, Cable Television Laboratories, Inc., CM-GL-PNMP-V02-110623, Jun. 23, 2011.*

(Continued)

*Primary Examiner* — Un C Cho
*Assistant Examiner* — Voster Preval
(74) *Attorney, Agent, or Firm* — Stewart M. Wiener

(57) ABSTRACT

A method of prioritizing estimated fault locations within a network includes monitoring multiple different performance parameters for unacceptable threshold levels via communications with a set of terminal network elements and separately analyzing the different performance parameters to identify potential network fault locations on the network. Accordingly, a plurality of priority rankings of potential network fault locations can be generated, one for each performance parameter monitored, and then combined to generate an overall priority ranking of potential fault locations including at least a highest priority inspection point estimated as being a most likely source of a fault on the network.

20 Claims, 21 Drawing Sheets

(56) References Cited

U.S. PATENT DOCUMENTS

| | | | |
|---|---|---|---|
| 5,228,060 | A | 7/1993 | Uchiyama |
| 5,251,324 | A | 10/1993 | McMullan et al. |
| 5,271,060 | A | 12/1993 | Moran et al. |
| 5,278,977 | A | 1/1994 | Spencer et al. |
| 5,347,539 | A | 9/1994 | Sridhar et al. |
| 5,390,339 | A | 2/1995 | Bruckert et al. |
| 5,463,661 | A | 10/1995 | Moran et al. |
| 5,532,865 | A | 7/1996 | Utsumi et al. |
| 5,557,603 | A | 9/1996 | Barlett et al. |
| 5,606,725 | A | 2/1997 | Hart |
| 5,631,846 | A | 5/1997 | Szurkowski |
| 5,692,010 | A | 11/1997 | Nielsen |
| 5,694,437 | A | 12/1997 | Yang et al. |
| 5,732,104 | A | 3/1998 | Brown et al. |
| 5,757,526 | A | 5/1998 | Shiragaki et al. |
| 5,771,274 | A * | 6/1998 | Harris .................. 379/22.03 |
| 5,790,523 | A | 8/1998 | Ritchie et al. |
| 5,862,451 | A | 1/1999 | Grau et al. |
| 5,867,539 | A | 2/1999 | Koslov |
| 5,870,429 | A | 2/1999 | Moran et al. |
| 5,886,749 | A | 3/1999 | Williams et al. |
| 5,939,887 | A | 8/1999 | Schmidt et al. |
| 5,943,604 | A | 8/1999 | Chen et al. |
| 6,032,019 | A | 2/2000 | Chen et al. |
| 6,061,393 | A | 5/2000 | Tsui et al. |
| 6,108,351 | A | 8/2000 | Hardy et al. |
| 6,154,503 | A | 11/2000 | Strolle et al. |
| 6,229,792 | B1 | 5/2001 | Anderson et al. |
| 6,230,326 | B1 | 5/2001 | Unger et al. |
| 6,233,274 | B1 | 5/2001 | Tsui et al. |
| 6,240,553 | B1 | 5/2001 | Son et al. |
| 6,272,150 | B1 | 8/2001 | Hrastar et al. |
| 6,278,730 | B1 | 8/2001 | Tsui et al. |
| 6,308,286 | B1 | 10/2001 | Richmond et al. |
| 6,310,909 | B1 | 10/2001 | Jones |
| 6,321,384 | B1 | 11/2001 | Eldering |
| 6,330,221 | B1 | 12/2001 | Gomez |
| 6,334,219 | B1 | 12/2001 | Hill et al. |
| 6,377,552 | B1 | 4/2002 | Moran, III et al. |
| 6,385,773 | B1 | 5/2002 | Schwartzman et al. |
| 6,389,068 | B1 | 5/2002 | Smith et al. |
| 6,434,583 | B1 | 8/2002 | Dapper et al. |
| 6,445,734 | B1 | 9/2002 | Chen et al. |
| 6,456,597 | B1 | 9/2002 | Bare |
| 6,459,703 | B1 | 10/2002 | Grimwood et al. |
| 6,477,197 | B1 | 11/2002 | Unger |
| 6,477,526 | B2 | 11/2002 | Hayashi et al. |
| 6,480,469 | B1 | 11/2002 | Moore et al. |
| 6,483,033 | B1 | 11/2002 | Simoes et al. |
| 6,498,663 | B1 | 12/2002 | Farhan et al. |
| 6,512,616 | B1 | 1/2003 | Nishihara |
| 6,526,260 | B1 | 2/2003 | Hick et al. |
| 6,546,557 | B1 | 4/2003 | Ovadia |
| 6,556,239 | B1 | 4/2003 | Al-Araji et al. |
| 6,556,562 | B1 | 4/2003 | Bhagavath et al. |
| 6,556,660 | B1 | 4/2003 | Li et al. |
| 6,559,756 | B2 | 5/2003 | Al-Araji et al. |
| 6,563,868 | B1 | 5/2003 | Zhang et al. |
| 6,570,394 | B1 | 5/2003 | Williams |
| 6,570,913 | B1 | 5/2003 | Chen |
| 6,574,797 | B1 | 6/2003 | Naegeli et al. |
| 6,588,016 | B1 | 7/2003 | Chen et al. |
| 6,606,351 | B1 | 8/2003 | Dapper et al. |
| 6,611,795 | B2 | 8/2003 | Cooper |
| 6,646,677 | B2 | 11/2003 | Noro et al. |
| 6,662,135 | B1 | 12/2003 | Burns et al. |
| 6,662,368 | B1 | 12/2003 | Cloonan et al. |
| 6,671,334 | B1 | 12/2003 | Kuntz et al. |
| 6,687,632 | B1 | 2/2004 | Rittman |
| 6,690,655 | B1 | 2/2004 | Miner et al. |
| 6,700,875 | B1 | 3/2004 | Schroeder et al. |
| 6,700,927 | B1 | 3/2004 | Esliger et al. |
| 6,711,134 | B1 | 3/2004 | Wichelman et al. |
| 6,741,947 | B1 | 5/2004 | Wichelman et al. |
| 6,748,551 | B2 | 6/2004 | Furudate et al. |
| 6,757,253 | B1 | 6/2004 | Cooper et al. |
| 6,772,388 | B2 | 8/2004 | Cooper et al. |
| 6,772,437 | B1 | 8/2004 | Cooper et al. |
| 6,775,840 | B1 | 8/2004 | Naegel et al. |
| 6,785,473 | B1 | 8/2004 | Sasaki et al. |
| 6,816,463 | B2 | 11/2004 | Cooper et al. |
| 6,834,057 | B1 | 12/2004 | Rabenko et al. |
| 6,839,829 | B1 | 1/2005 | Daruwalla et al. |
| 6,853,932 | B1 | 2/2005 | Wichelman et al. |
| 6,877,166 | B1 | 4/2005 | Roeck et al. |
| 6,895,043 | B1 | 5/2005 | Naegeli et al. |
| 6,895,594 | B1 | 5/2005 | Simoes et al. |
| 6,906,526 | B2 | 6/2005 | Hart, Jr. et al. |
| 6,928,475 | B2 | 8/2005 | Schenkel et al. |
| 6,944,881 | B1 | 9/2005 | Vogel |
| 6,961,314 | B1 | 11/2005 | Quigley et al. |
| 6,961,370 | B2 | 11/2005 | Chappell |
| 6,967,994 | B2 | 11/2005 | Boer et al. |
| 6,973,141 | B1 | 12/2005 | Isaksen et al. |
| 6,985,437 | B1 | 1/2006 | Vogel |
| 6,987,754 | B2 | 1/2006 | Shahar et al. |
| 6,999,408 | B1 | 2/2006 | Gomez |
| 7,002,899 | B2 | 2/2006 | Azenkot et al. |
| 7,010,002 | B2 | 3/2006 | Chow et al. |
| 7,017,176 | B1 | 3/2006 | Lee et al. |
| 7,032,159 | B2 | 4/2006 | Lusky et al. |
| 7,039,939 | B1 | 5/2006 | Millet et al. |
| 7,050,419 | B2 | 5/2006 | Azenkot et al. |
| 7,054,554 | B1 | 5/2006 | McNamara et al. |
| 7,058,007 | B1 | 6/2006 | Daruwalla et al. |
| 7,072,365 | B1 | 7/2006 | Ansley |
| 7,079,457 | B2 | 7/2006 | Wakabayashi et al. |
| 7,099,412 | B2 | 8/2006 | Coffey |
| 7,099,580 | B1 | 8/2006 | Bulbul |
| 7,139,283 | B2 | 11/2006 | Quigley et al. |
| 7,142,609 | B2 | 11/2006 | Terreault et al. |
| 7,145,887 | B1 | 12/2006 | Akgun et al. |
| 7,152,025 | B2 | 12/2006 | Lusky et al. |
| 7,158,542 | B1 | 1/2007 | Zeng et al. |
| 7,164,694 | B1 | 1/2007 | Nodoushani et al. |
| 7,177,324 | B1 | 2/2007 | Choudhury et al. |
| 7,197,067 | B2 | 3/2007 | Lusky et al. |
| 7,222,255 | B1 | 5/2007 | Claessens et al. |
| 7,227,863 | B1 | 6/2007 | Leung et al. |
| 7,242,862 | B2 | 7/2007 | Saunders et al. |
| 7,246,368 | B1 | 7/2007 | Millet et al. |
| 7,263,123 | B2 | 8/2007 | Yousef |
| 7,274,735 | B2 | 9/2007 | Lusky et al. |
| 7,286,756 | B1 | 10/2007 | Marshall et al. |
| 7,295,518 | B1 | 11/2007 | Monk et al. |
| 7,315,573 | B2 | 1/2008 | Lusky et al. |
| 7,315,967 | B2 | 1/2008 | Azenko et al. |
| 7,400,677 | B2 | 7/2008 | Jones |
| 7,421,276 | B2 | 9/2008 | Steer et al. |
| 7,451,472 | B2 | 11/2008 | Williams |
| 7,492,703 | B2 | 2/2009 | Lusky et al. |
| 7,554,902 | B2 | 6/2009 | Kim et al. |
| 7,573,884 | B2 | 8/2009 | Klimker et al. |
| 7,573,935 | B2 | 8/2009 | Min et al. |
| 7,584,298 | B2 | 9/2009 | Klinker et al. |
| 7,616,654 | B2 | 11/2009 | Moran, III et al. |
| 7,650,112 | B2 | 1/2010 | Utsumi et al. |
| 7,672,310 | B2 | 3/2010 | Cooper et al. |
| 7,684,315 | B1 | 3/2010 | Beser |
| 7,684,341 | B2 | 3/2010 | Howald |
| 7,693,042 | B1 | 4/2010 | Wei |
| 7,693,090 | B1 | 4/2010 | Kimpe |
| 7,701,938 | B1 | 4/2010 | Bernstein et al. |
| 7,716,712 | B2 | 5/2010 | Booth et al. |
| 7,739,359 | B1 | 6/2010 | Millet et al. |
| 7,742,697 | B2 | 6/2010 | Cooper et al. |
| 7,742,771 | B2 | 6/2010 | Thibeault |
| 7,760,624 | B1 | 7/2010 | Goodson et al. |
| 7,764,231 | B1 | 7/2010 | Karr et al. |
| 7,778,314 | B2 | 8/2010 | Wajcer et al. |
| 7,787,557 | B2 | 8/2010 | Kim et al. |
| 7,792,183 | B2 | 9/2010 | Massey et al. |
| 7,826,569 | B2 | 11/2010 | Popper et al. |
| 7,856,049 | B2 | 12/2010 | Currivan et al. |

(56) References Cited

U.S. PATENT DOCUMENTS

| | | |
|---|---|---|
| 7,876,697 B2 | 1/2011 | Thompson et al. |
| 7,953,144 B2 | 5/2011 | Allen et al. |
| 7,958,534 B1 | 6/2011 | Beser |
| 7,970,010 B2 | 6/2011 | Denney et al. |
| 7,983,162 B1 | 7/2011 | Ford et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,279,764 B2 | 10/2012 | Cooper et al. |
| 8,284,828 B2 | 10/2012 | Cooper et al. |
| 8,345,557 B2 | 1/2013 | Thibeault et al. |
| 8,526,485 B2 | 9/2013 | Thompson et al. |
| 8,537,972 B2 | 9/2013 | Thompson et al. |
| 8,594,118 B2 | 11/2013 | Cooper et al. |
| 2001/0055319 A1 | 12/2001 | Quigley et al. |
| 2002/0038461 A1 | 3/2002 | White |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0119783 A1 | 8/2002 | Bourlas et al. |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0067944 A1 | 4/2003 | Sala et al. |
| 2003/0101463 A1 | 5/2003 | Greene et al. |
| 2003/0108052 A1 | 6/2003 | Inoue et al. |
| 2003/0120819 A1 | 6/2003 | Abramson |
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052248 A1 | 3/2004 | Frank et al. |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0153855 A1* | 8/2004 | Titmuss ............. H04L 41/065 714/43 |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0099951 A1 | 5/2005 | Mohan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra |
| 2006/0088056 A1 | 4/2006 | Quigley et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2006/0291503 A1 | 12/2006 | Chapman |
| 2007/0002752 A1 | 1/2007 | Thibeault et al. |
| 2007/0030805 A1 | 2/2007 | Pantelias et al. |
| 2007/0058542 A1 | 3/2007 | Thibeault |
| 2007/0076592 A1 | 4/2007 | Thibeault |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0121712 A1 | 5/2007 | Okamoto |
| 2007/0133672 A1 | 6/2007 | Lee et al. |
| 2007/0143654 A1 | 6/2007 | Joyce et al. |
| 2007/0147489 A1 | 6/2007 | Sun |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0201547 A1 | 8/2007 | Willcocks et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223512 A1 | 9/2007 | Cooper et al. |
| 2007/0223513 A1 | 9/2007 | Pantelias et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0065960 A1 | 3/2008 | Cheng et al. |
| 2008/0069006 A1 | 3/2008 | Walter et al. |
| 2008/0075157 A1 | 3/2008 | Allen et al. |
| 2008/0101210 A1 | 5/2008 | Thompson et al. |
| 2008/0125984 A1 | 5/2008 | Skendzic et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0109877 A1 | 4/2009 | Murray et al. |
| 2009/0158096 A1 | 6/2009 | Ali et al. |
| 2009/0249421 A1 | 10/2009 | Liu et al. |
| 2009/0252234 A1 | 10/2009 | Samdani et al. |
| 2010/0083356 A1 | 4/2010 | Steckley et al. |
| 2010/0095360 A1 | 4/2010 | Pavlovski et al. |
| 2010/0128739 A1 | 5/2010 | Jung et al. |
| 2010/0154016 A1 | 6/2010 | Li et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0185391 A1 | 7/2010 | Lee et al. |
| 2010/0223650 A1 | 9/2010 | Millet et al. |
| 2010/0251320 A1 | 9/2010 | Shafer et al. |
| 2010/0322390 A1 | 12/2010 | Bialk et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0072127 A1 | 3/2011 | Gerber et al. |
| 2011/0099570 A1 | 4/2011 | Sadja et al. |
| 2011/0110415 A1 | 5/2011 | Cooper et al. |
| 2011/0116387 A1* | 5/2011 | Beeco et al. ................. 370/242 |
| 2011/0150058 A1 | 6/2011 | Oh |
| 2011/0153683 A1 | 6/2011 | Hoskinson |
| 2011/0194418 A1 | 8/2011 | Wolcott et al. |
| 2011/0194597 A1 | 8/2011 | Wolcott et al. |

(56) References Cited

U.S. PATENT DOCUMENTS

| | | | |
|---|---|---|---|
| 2011/0197071 A1 | 8/2011 | Wolcott et al. | |
| 2011/0243214 A1 | 10/2011 | Wolcott et al. | |
| 2011/0252337 A1* | 10/2011 | Pignataro | H04L 41/0266 715/748 |
| 2012/0027069 A1 | 2/2012 | Clausen et al. | |
| 2012/0054312 A1 | 3/2012 | Salinger | |
| 2012/0084416 A1 | 4/2012 | Thibeault et al. | |
| 2012/0093240 A1 | 4/2012 | McFarland et al. | |
| 2012/0115505 A1 | 5/2012 | Miyake et al. | |
| 2012/0147751 A1 | 6/2012 | Ulm | |
| 2012/0190380 A1 | 7/2012 | Duprey et al. | |
| 2013/0003565 A1 | 1/2013 | Gotwals et al. | |
| 2013/0041990 A1 | 2/2013 | Thibeault et al. | |
| 2013/0051442 A1 | 2/2013 | Cooper et al. | |
| 2013/0070772 A1 | 3/2013 | Watson et al. | |
| 2013/0128723 A1 | 5/2013 | Thibeault et al. | |
| 2013/0148707 A1 | 6/2013 | Thibeault et al. | |
| 2013/0286852 A1 | 10/2013 | Bowler et al. | |
| 2013/0290783 A1 | 10/2013 | Bowler et al. | |
| 2013/0290791 A1 | 10/2013 | Basile et al. | |
| 2013/0291034 A1 | 10/2013 | Basile et al. | |
| 2013/0294489 A1 | 11/2013 | Thibeault et al. | |
| 2014/0029654 A1 | 1/2014 | Thompson et al. | |
| 2014/0029655 A1 | 1/2014 | Thompson et al. | |
| 2014/0133533 A1 | 5/2014 | Thibeault et al. | |
| 2014/0185428 A1 | 7/2014 | Thibeault et al. | |
| 2014/0198630 A1* | 7/2014 | Nof | H04L 45/28 370/216 |
| 2014/0204954 A1* | 7/2014 | Nee | H04L 45/302 370/401 |
| 2014/0267788 A1 | 9/2014 | Bowler et al. | |
| 2014/0269416 A1 | 9/2014 | Bowler et al. | |
| 2014/0269869 A1 | 9/2014 | Bowler et al. | |
| 2014/0270095 A1 | 9/2014 | Bowler et al. | |
| 2014/0278273 A1 | 9/2014 | Bowler et al. | |
| 2014/0355454 A1* | 12/2014 | Serban | H04W 24/08 370/245 |

FOREIGN PATENT DOCUMENTS

| | | |
|---|---|---|
| EP | 1341335 A2 | 9/2003 |
| JP | 55132161 A | 10/1980 |
| JP | 04208707 A | 7/1992 |
| JP | 06120896 A | 4/1994 |
| JP | 06177840 A | 6/1994 |
| JP | 09008738 A | 1/1997 |
| JP | 09162816 A | 6/1997 |
| JP | 10247893 A | 9/1998 |
| JP | 11230857 A | 8/1999 |
| JP | 2001044956 A | 2/2001 |
| JP | 2003530761 T | 10/2003 |
| JP | 2004172783 A | 6/2004 |
| JP | 2004343678 A | 12/2004 |
| WO | 0192901 A1 | 12/2001 |
| WO | 2002/033980 A2 | 4/2002 |
| WO | 0233974 A1 | 4/2002 |
| WO | 2004062124 A1 | 7/2004 |
| WO | 2008/103262 A1 | 8/2008 |
| WO | 2009146426 A1 | 12/2009 |

OTHER PUBLICATIONS

"Proactive Network Maintenance Using Pre-Equalization," DOCSIS Best Practices and Guidelines, Cable Television Laboratories, Inc., CM-GL-PNMP-V02-110623, Jun. 23, 2011, pp. 133.

R. Hranac, "BER and MER fundamentals", CISCO, 2007, Retrieved from the Internet: URL:http://www.gcscte.org/presentations/2008/Ron.Hranac_Presentation-BER%20+%20MER%20Fun.pdf, retrieved on Dec. 11, 2014, all pages.

Cable Television Laboratories, Inc., "A Simple Algorithm for Fault Localization Using Naming Convention and Micro-reflection Signature," Invention Disclosure 60193, 2 pages, Jun. 2008.

Cable Television Laboratories, Inc., "Data-Over-Cable Service Interface Specifications DOCSIS® 3.0—MAC and Upper Layer Protocols Interface Specification," CM-SP-MULPIv3.0-117-111117, Nov. 2011.

Cable Television Laboratories, Inc., "DOCSIS Best Practices and Guidelines: Proactive Network Maintenace Using Pre-Equalization," CM-GL-PNMP-V01-100415, Apr. 2010.

Cable Television Laboratories, Inc., "Pre-Equalization Based Pro-active Network Maintenance Process Model for CMs Transmitting on Multiple Upstream Channels," Invention Disclosure 60203, 2 pages, May 2009.

Cable Television Laboratories, Inc., "Pre-Equalization based pro-active network maintenance process model", Invention Disclosure 60177, 2 pages, Jun. 2008.

Cable Television Laboratories, Inc., "DOCSIS® Best Practices and Guidelines: Proactive Network Maintenance Using Pre-equalization," CM-GL-PNMP-V02-110623, Jun. 2011.

Cable Television Laboratories, Inc., "Data-Over-Cable Service Interface Specifications: DOCSIS 2.0 Radio Frequency Interface Specification," CM-SP-RFIv2.0-I06-040804, Apr. 2004.

L.A. Campos, et al., "Pre-equalization based Pro-active Network Maintenance Methodology", Cable Television Laboratories, Inc., presentation, 32 pages, 2008.

R.L. Howald, et al., "Customized Broadband—Analysis Techniques for Blended Multiplexes," NCTA Technical Papers, 2002.

R. Howald, "Access Networks Solutions: Introduction to S-CDMA," Presentation to Society of Cable Telecommunications Engineers (SCTE) South Florida Chapter, 2009.

R. Howald, "Upstream Snapshots & Indicators (2009)," Regional Samples, Presentation to Society of Cable Telecommunications Engineers (SCTE) South Florida Chapter, Jan. 2010.

R.L. Howald et al., "Characterizing and Aligning the HFC Return Path for Successful DOCSIS 3.0 Rollouts", SCTE Cable—Tec Expo, Oct. 2009.

R. Howald, et al., "DOCSIS 3.0 Upstream: Readiness & Qualification," SCTE Cable—Tec Expo, Oct. 2009.

R. Howald, et al., "The Grown-Up Potential of a Teenage PHY", NCTA Convention and Exposition, May 2012.

R. Howald, "DOCSIS 3.0 Upstream: Technology, RF Variables & Case Studies," Access Networks Solutions, 2009, presentation to Society of Cable Telecommunications Engineers (SCTE) South Florida Chapter, 23 pages, Jan. 2010.

R. Hranac, "Linear Distortions, Part 1," Communication Technology, Jul. 2005.

X. Liu, et al., "Variable Bit Rate Video Services in DOCSIS 3.0 Networks," NCTA Technical Papers, 2008.

Motorola, Inc., "White Paper: Expanding Bandwidth Using Advanced Spectrum Management," Sep. 25, 2003.

H. Newton, Newton's Telecom Dictionary, Flatiron Publishing, 9th ed., pp. 216 and 1023 (definitions of "carrier to noise ratio" and "signal to noise ratio"), Sep. 1995.

M. Patrick, et al., "Delivering Economical IP Video over DOCSIS by Bypassing the M-CMTS with DIBA," SCTE 2007 EmergingTechnologies, NCTA Technical Papers, 2007.

A. Popper, et al., "An Advanced Receiver with Interference Cancellation for Broadband Cable Networks," 2002 International Zurich Seminar on Broadband Communications—Access, Transmission, Networking, pp. 23-1-23-6, IEEE, 2002.

A. Popper, et al, "Ingress Noise Cancellation for the Upstream Channel in Broadband Cable Access Systems," 2002 IEEE International Conference on Communications, vol. 3, pp. 1808-1812. IEEE, 2002.

S.U.H. Qureshi, "Adaptive Equalization," Proceedings of the IEEE, vol. 73, No. 9, pp. 1349-1387, Sep. 1985.

S. Ramakrishnan, "Scaling the DOCSIS Network for IPTV," SCTE Conference on Emerging Technologies, NCTA Cable Show, Apr. 2009.

Y.R. Shelke, "Knowledge Based Topology Discovery and Geo-localization", Thesis, Master of Science, Ohio State University, 2010.

R. Thompson, et al., "256-QAM for Upstream HFC," NCTA 2010 Spring Technical Forum Proceedings, pp. 142-152 May 2010.

(56) References Cited

OTHER PUBLICATIONS

R. Thompson, et al., "256-QAM for Upstream HFC Part Two", SCTE Cable-Tec Expo 2011, Technical Paper, Nov. 2011.
R. Thompson, et al., "Multiple Access Made Easy," SCTE Cable-Tec Expo 2011, Technical Paper, Nov. 2011.
R. Thompson, et al., "Optimizing Upstream Throughput Using Equalization Coefficient Analysis", National Cable & Telecommunications Association (NCTA) Technical Papers, Apr. 2009.
R. Thompson, et al., "Practical Considerations for Migrating the Network Toward All-Digital", Society of Cable Telecommunications Engineers (SCTE) Cable-Tec Expo, Oct. 2009.
R. Thompson, et al., "64-QAM, 6.4MHz Upstream Deployment Challenges," SCTE Canadian Summit, Toronto, Canada, Technical Paper, Mar. 2011.
B. Volpe, et al., "Cable-Tec Expo 2011: Advanced Troubleshooting in a DOCSIS© 3.0 Plant," Nov. 2011.
L. Wolcott, "Modem Signal Usage and Fault Isolation," U.S. Appl. No. 61/301,835, filed Feb. 5, 2010.
F. Zhao, et al., "Techniques for minimizing error propagation in decision feedback detectors for recording channels," IEEE Transactions on Magnetics, vol. 37, No. 1, pp. 592-602, Jan. 2001.
Y. Morishita, et al., "An LMS adaptive equalizer using threshold in impulse noise environments", IEEE, ICT 2003 10th International Conference on Telecommunications, vol. 1, pp. 578-582, Feb. 2003.

\* cited by examiner

| MESSAGE | SEVERITY | LOCATION |
|---|---|---|
| FEC CORRECTED THRESHOLD EXCEEDED | WARNING | US CH 10 |
| FEC UNCORRECTED THRESHOLD EXCEEDED | MINOR | US CH 20 |
| FLAP THRESHOLD EXCEEDED | WARNING | US CH 10 |
| CHANNEL UTILIZATION EXCEEDED | WARNING | US CH 25 |

| TOPOLOGY | |
|---|---|
| ▷ CMTS-1 | 3 |
| ▽ CMTS-2 | 4 |
|    FN-A | 4 |
|    FN-B | 0 |
| ▷ CMTS-3 | 0 |
| ▷ CMTS-4 | 0 |
| ▷ CMTS-5 | 0 |

ALARM TREE ALLOWS DRILL DOWN INTO SECTIONS OF NETWORK

ALERTS PER NE CORRESPOND TO ALARMS IN TABLE

*FIG. 5*

| MESSAGE | SEVERITY | LOCATION |
|---|---|---|
| FEC CORRECTED THRESHOLD EXCEEDED | WARNING | US CH 10 |
| FEC UNCORRECTED THRESHOLD EXCEEDED | MINOR | US CH 20 |
| FLAP THRESHOLD EXCEEDED | WARNING | US CH 10 |
| CHANNEL UTILIZATION EXCEEDED | WARNING | US CH 25 |

| TOPOLOGY | CRITICAL | MAJOR | MINOR |
|---|---|---|---|
| ▷ CMTS-1 | 0 | 0 | 4 |
| ▽ CMTS-2 | 2 | 2 | 1 |
|     FN-A | 2 | 1 | 1 |
|     FN-B | 0 | 0 | 0 |
| ▷ CMTS-3 | 0 | 0 | 0 |
| ▷ CMTS-4 | 0 | 0 | 0 |
| ▷ CMTS-5 | 0 | 0 | 0 |

ALARM TOPOLOGY TREE EXPANDS OUT TO DISPLAY CONTEXT SENSITIVE ALARM COUNTS

METHOD FOR IDENTIFYING AND PRIORITIZING FAULT LOCATION IN A CABLE PLANT

BACKGROUND

Program providers such as multiple system operators, television networks and stations, cable TV operators, satellite TV operators, studios, wireless service providers, and Internet broadcasters/service providers, among others, require broadband communication systems to deliver programming and like content to consumers/subscribers over networks via digital or analog signals. Such networks and physical plants tend to be extensive and complex and therefore are difficult to manage and monitor for faults, impairments, maintenance issues and the like.

Monitoring network maintenance activities particularly presents problems to operators of extensive cable networks. For purposes of example, a cable network may include a headend which is connected to several nodes that may provide access to IP or ISPN networks. The cable network may also include a variety of cables such as coaxial cables, optical fiber cables, or a Hybrid Fiber/Coaxial (HFC) cable system which interconnect terminal network elements of subscribers to the headend in a tree and branch structure. The terminal network elements (media terminal adaptors (MTAs), cable modem, set top box, etc.) reside on the nodes which may be combined and serviced by common components at the headend.

Cable modems may support data connection to the Internet and other computer networks via the cable network. Thus, cable networks provide bi-directional communication systems in which data can be sent downstream from the headend to a subscriber and upstream from a subscriber to the headend. The headend typically interfaces with cable modems via a cable modem termination system (CMTS) which has several receivers. Each receiver of the CMTS may connect to numerous nodes which, in turn, may connect to numerous network elements, such as modems, media terminal adaptors (MTAs), set top boxes, terminal devices, customer premises equipment (CPE) or like devices of subscribers. A single receiver of the CMTS, for instance, may connect to several hundred or more network elements.

The conventional process for tracking which terminal devices are attached to which optical node and like information is a manual process. For instance, when a new customer's services are first enabled, a network operator may identify the specific node or location of the user and enter this information manually into a customer management database. This information can be valuable for resolving physical layer communications issues, performing periodic plant maintenance, and planning future service expansions. However, when the data is inaccurate or incomplete, it can lead to misdiagnosis of issues, excessive costs associated with maintenance, and prolonged new deployments. In addition, as communication traffic increases or new services are deployed, the need to understand loading of parts of the network becomes important, particularly if existing subscribers must be reallocated to different nodes or parts of the network.

Based on conventional practice, locating and identifying network and physical plant issues essentially relies upon the receipt of customer calls and manual technician analysis in response thereto.

BRIEF DESCRIPTION OF THE DRAWINGS

Various features of the embodiments described in the following detailed description can be more fully appreciated when considered with reference to the accompanying figures, wherein the same numbers refer to the same elements.

FIG. 5 is a view of an interactive user interface display which shows an alarm tree for use in investigating information of alarms shown on the display according to an embodiment.

FIG. 6 is a view similar to FIG. 5 with the alarm tree further expanded in accordance with an embodiment.

FIG. 10 is a view of a graphical user interface similar to FIG. 9 and including a listing of alarms for the cable modems displayed on the map according to an embodiment.

DETAILED DESCRIPTION

Figure 1:
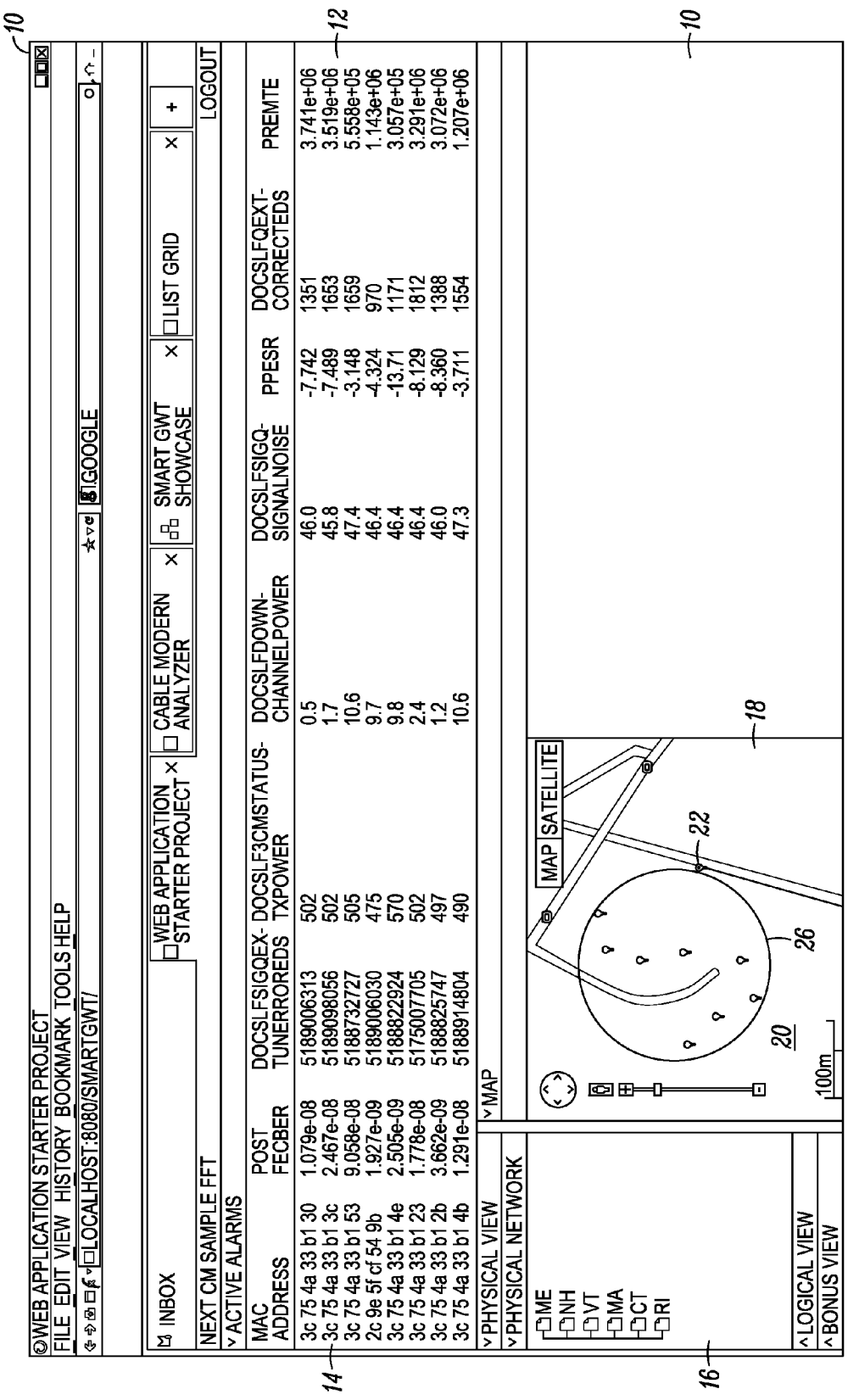
FIG. 1 is a snapshot screen view of a so-called dashboard of a graphical user interface according to an embodiment.

For simplicity and illustrative purposes, the principles of embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Embodiments disclosed herein are directed to automated management and monitoring systems, tools, and methods that enable issues occurring in a network, such as a cable network, to be proactively and automatically detected and located. The embodiments leverage a combination of key data and network topology such as information concerning the geographical location of an issue, the nature of the issue, and/or the severity of an issue to permit a network operator to quickly detect, isolate, locate and address problems. In addition, collection and analysis of historical, long term and periodic health information of a network provided by the embodiments can aid in determining trends that may indicate slow and steady degradation of a network element or component. Such degradation has conventionally remained undetected when relying only on manual spot checks by field technicians and only becomes detectable upon component failure.

According to embodiments, the above referenced tasks are accomplished automatically by a management and monitoring tool that is able to scale across extremely large networks thereby enabling network operators to become more proactive with network maintenance activities and to achieve higher levels of network availability and reliability. Operational costs can be reduced by decreasing the need for troubleshooting at a time after the occurrence of the problem or issue. In addition, the periodic collection and analysis of network conditions provides a view into critical network indicators and aids in resolving issues prior to customer impact.

Network monitoring can be performed such that information concerning geographic location of monitored network elements, such as cable modems or the like, and associated network component topology, such as HFC components and the like, are automatically populated into a network management database or the like for purposes of providing a visual display, such as a geographically accurate street map or satellite image of a region of a service area, that clearly indicates a fault or other issue and the geographical location thereof. Examples are provided by FIGS. 15-20. Thus, the path that the network takes geographically is displayed on the map along with the physical location of network elements and components within the network. Such a map provides a useful network management tool to network operators and field technicians for resolving issues in an efficient and prompt manner.

As one contemplated example, the map can be provided as part of a graphical interface which displays faults of varying severity levels ranging from critical to completely non-service affecting. Accordingly, in at least some embodiments, the severity of a fault on the network can be determined and displayed with the estimated geographic location of the fault on the map.

In addition, the network monitoring and management system or tool can be provided and fully integrated into software that is loaded and resides on a server or remote server connected to or communicating with the network. Of course, the software may reside on other devices and equipment such as equipment located at the headend of the network, cloud devices, and portable or mobile devices. Utilization of the software eliminates the need for manual analysis of data and permits large amounts of data to be automatically analyzed electronically by microprocessors or the like on a large scale.

The network management tool or software may estimate and make assumptions regarding probable tap and passive locations, and couple this information with known optical node location data, and with walking directions data from a geographical data (geodata) services provider. Walking directions data may be in accordance with an appropriate format, language, or standard; examples include, but are not limited to, data in Keyhole Markup Language (KML), e.g., Open Geospatial Consortium (OGC) KML, or the OpenGIS KML Encoding Standard. From this cumulative information, the network management tool or software can estimate and automatically populate a map or the like of a given service area with monitored cable modem locations and associated network component topology. See FIGS. 15-20 for examples.

The geographic location of a fault and surrounding network path can be estimated, isolated, and displayed despite minimum information and manually entered data concerning the actual network path or network element location being available. The graphical interface can identify and display specific network elements as problematic. As an example, a network or HFC component such as cables, taps, passives, or the like that is identified as a suspect component potentially contributing to linear distortion, excessive loss impairments, or the like may be identified and displayed as a location of a fault. Whether a fault impacts a single subscriber or a group of subscribers may also be estimated and shown in the display.

Still further, the network management tool may be used to identify clusters or groups of network elements or cable modems that may share network or HFC infrastructure, such as common components including optics, nodes, amps, cables, taps, passives, and the like. In this regard, Management Information Base (MIB) information for service groups readily available via data pulls from a CMTS or like equipment at the headend of the network can be used in conjunction with the above referenced geographical location information. Network element groups or clusters can be readily displayed via the graphical interface and without the need for the software to reference other sources, perform testing, or wait for common impairment signature alarms to be raised.

Still further, the severity of a fault may be estimated with respect to upstream impairments through association of physical layer metrics including pre and post forward error correction (FEC) along with the number of impacted network elements or subscribers. Higher priority alarms can be assigned to groups of network elements or subscribers that exceed threshold values. In contrast, lower priority alarms can be assigned to faults such as detected for single network elements or subscribers.

According to an embodiment, the graphical interface referenced above may be presented in the form of a so-called "dashboard" to a user such as personnel of a network operations center. Critical alarms may be shown across the entire network in a geographical display of the network or parts thereof. In addition, access may be provided to statistics via use of the dashboard to allow the user to monitor the overall health of their network.

By way of example, various snap-shot views of a graphical user interface are provided in FIGS. 1-14. It should be understood that these displays are disclosed for purposes of example only and may be altered as desired.

Figure 2:
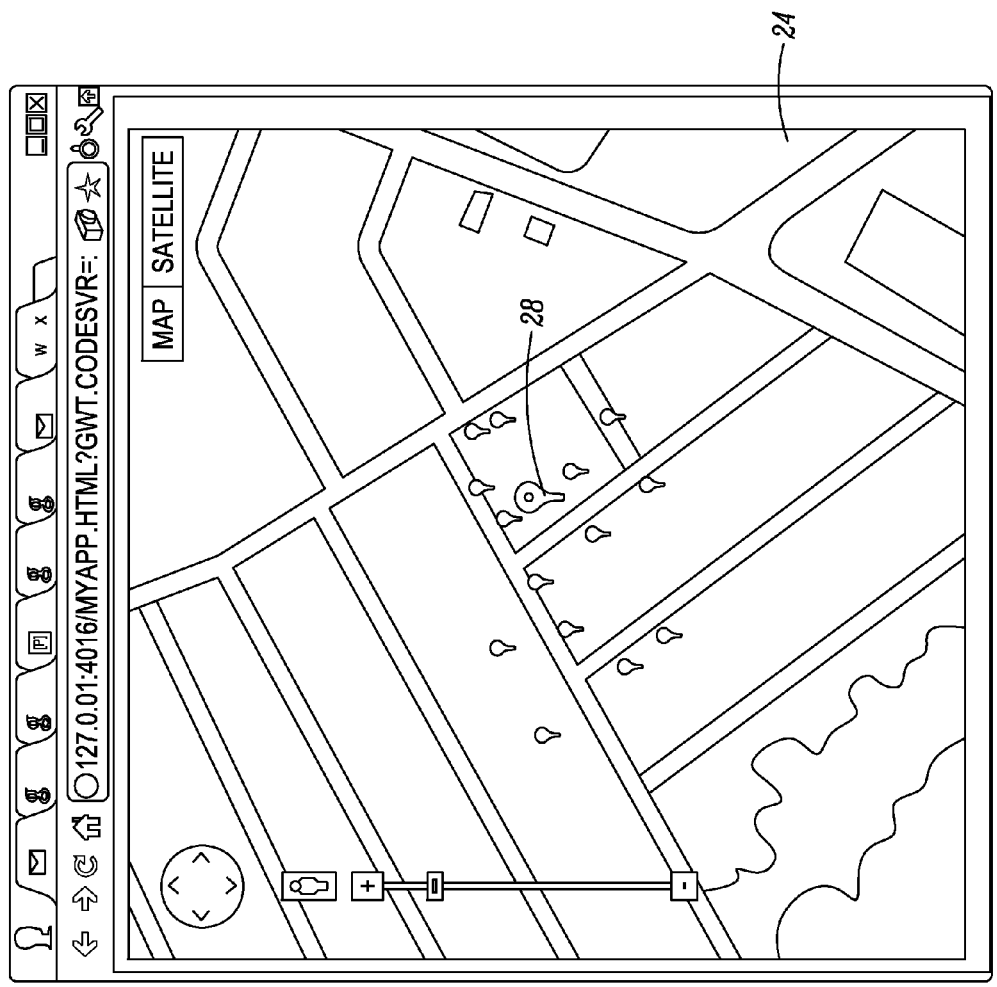
FIG. 2 is a view of a panel of the dashboard showing a cluster of objects displayed on top of a satellite image of a geographic area into which a network extends according to an embodiment.

A first example of a dashboard 10 which may be displayed to a user via a monitor or like electronic display screen is shown in FIG. 1. In this example, a first panel 12 of the dashboard 10 provides information of "Active Alarms" including a list of alarms or potential faults 14, a second panel 16 provides a so-called "Physical View" of the network, and a third panel 18 provides a geographically-accurate street map 20 showing the geographical location of the alarms listed in panel 12 along with the nearest node 22 or other network component. The map 20 may include roads and streets and names thereof. In addition, as best illustrated in FIG. 2, alarms can be overlaid on images 24, for instance satellite images, of the geographical service area in which the alarms are located.

When an issue, fault or alarm is identified, it can be associated and displayed with other issues, faults and alarms based on geographical proximity. For instance, see the alarms 14 within circle 26 in FIG. 1. This group or cluster of alarms provides a visual indicator of the network elements affected and can indicated a center point of a potential problem causing the cluster of alarms. For instance, see the center point 28 in FIG. 2. A user which selects the center point may be provided with a listing of problem network elements or modems. In addition, the cluster of alarms may have a single corresponding "alarm" object to thereby reduce the number of alarms displayed to the user.

After an issue is first identified by the network monitoring and management system, tool or software, the operator or user may be provided with several options to further investigate the apparent problem or problems. For instance, network issues may be isolated by "serving group" or "geographic proximity" (i.e., clustering) and may be prioritized by severity based on the number of customers/subscribers affected and the extent to which faults are service-affecting. The network faults can be linked by the management software to a map interface which enables the fault to be connected to a physical location in the network.

FIGS. 3-11 provide further examples of views of a dashboard which may be displayed to a network operator. Any type or number of available charts, maps, or alert views can be viewed and organized in the dashboard. By way of example, the dashboard 30 shown in FIG. 3 may be configured as a starting point when a user first logs onto the network monitoring and management software or system. Here, a "zoomed-out" view of the network is initially provided to permit an overall view of the network, which may span a large geographic area. Data is collected and analyzed by the network monitoring and management tool to identify a type of fault or faults and the estimated geographic location of the fault(s) solely based on analysis of the data.

Figure 3:
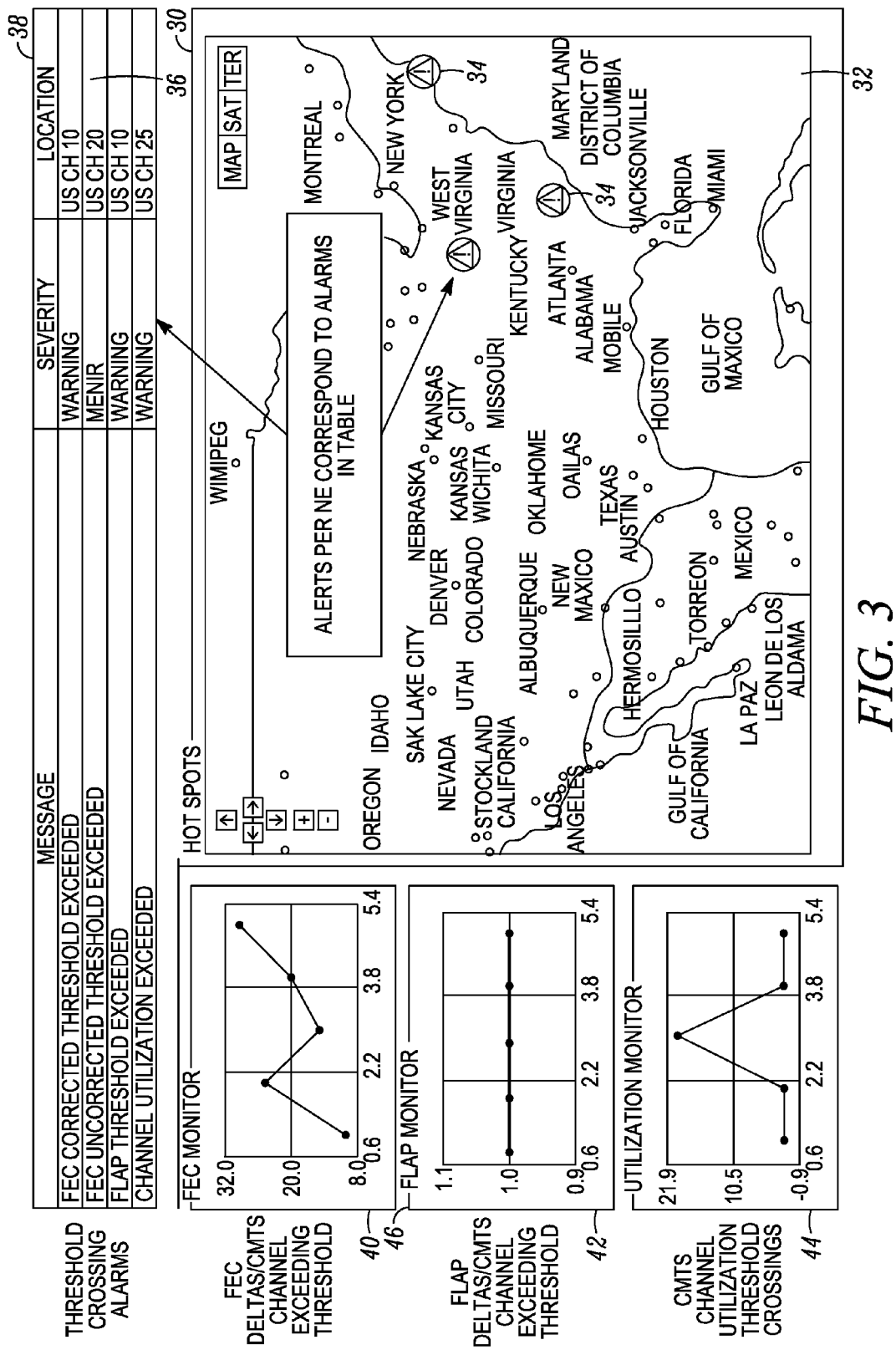
FIG. 3 is a view of an interactive user interface display which may provide a starting point of the dashboard once a user logs into the system according to an embodiment.
Figure 4:
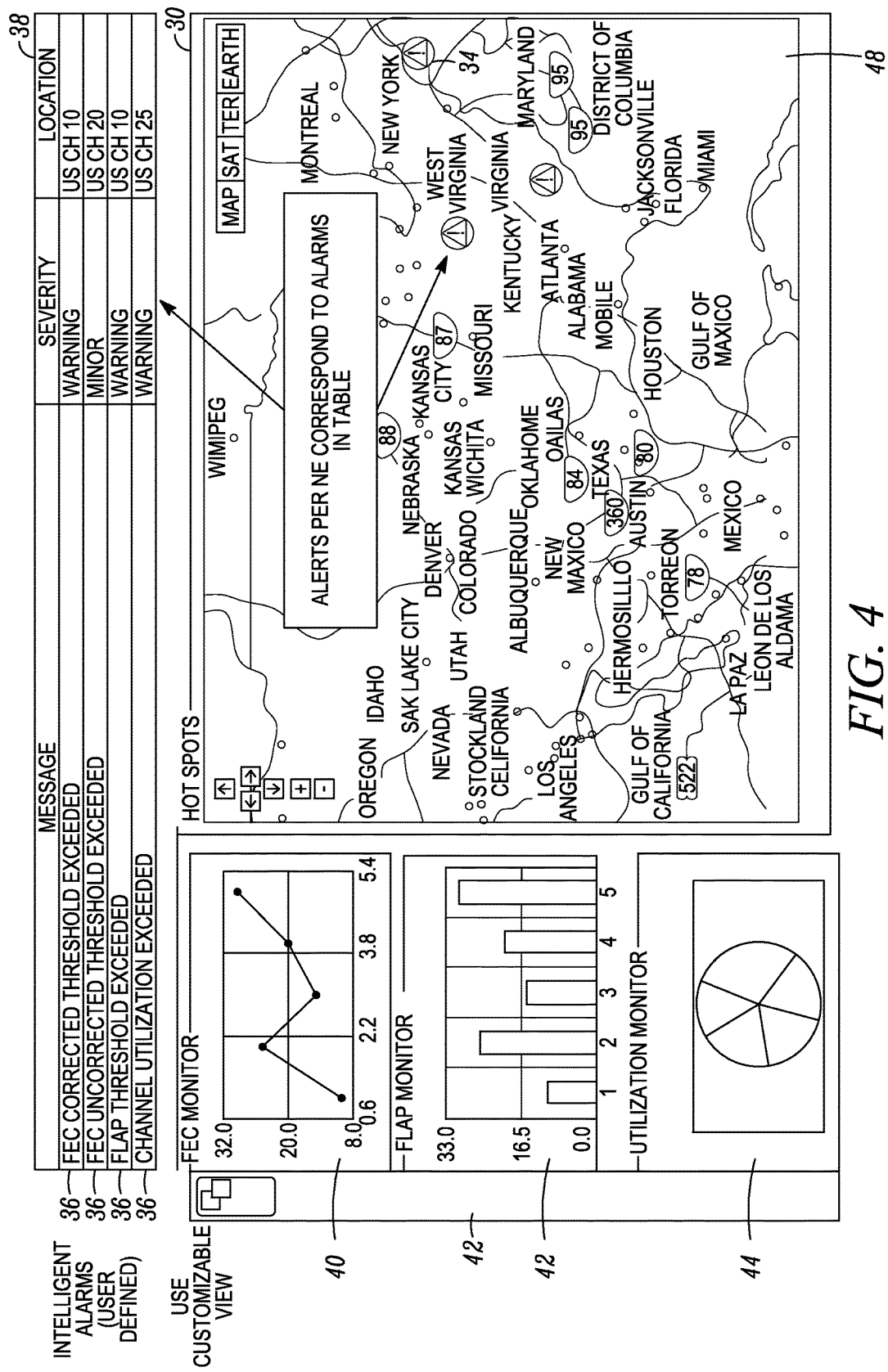
FIG. 4 is a view similar to FIG. 3 with the map further zoomed-in to a particular region of the network service area according to an embodiment.

FIG. 3 provides an entire network view 32 based on a geographic format and provides an indication of so-called "hot-spots" 34 of alarms. A listing 36 of alarms can be provided in a panel 38 which can also indicate the severity and location of the hot-spots 34. Charts such as a FEC deltas/CMTS channel exceeding threshold chart 40, a Flap deltas/CMTS channel exceeding threshold chart 42, and a CMTS channel utilization threshold crossing chart 44 can be displayed in a panel 46 and correspond to the alarms shown in the listing 36. Of course, these charts provide just a few examples of possible charts. A further example of such a dashboard is shown in FIG. 4 which provides a display of a section of the map 48 in greater detail.

In FIG. 5, a dashboard is shown in which panel 50 provides information on network topology. Here, the topology is provided in a form of a so-called alarm tree which enables a user to gain further information with respect to more narrowly defined sections of the network. For example, the topology could list CMTSs (such as CMTS-1, CMTS-2, CMTS-3, CMTS-4, and CMTS-5). Further, the fiber nodes (i.e., FN-A and FN-B) can be shown for any of the CMTSs and a number of network elements associated with an alarm can be listed. As shown in FIG. 6, the panel 50 can also be expanded to show the number of network elements associated with alarms per severity of alarm (i.e., critical, major, and minor).

Figure 7:
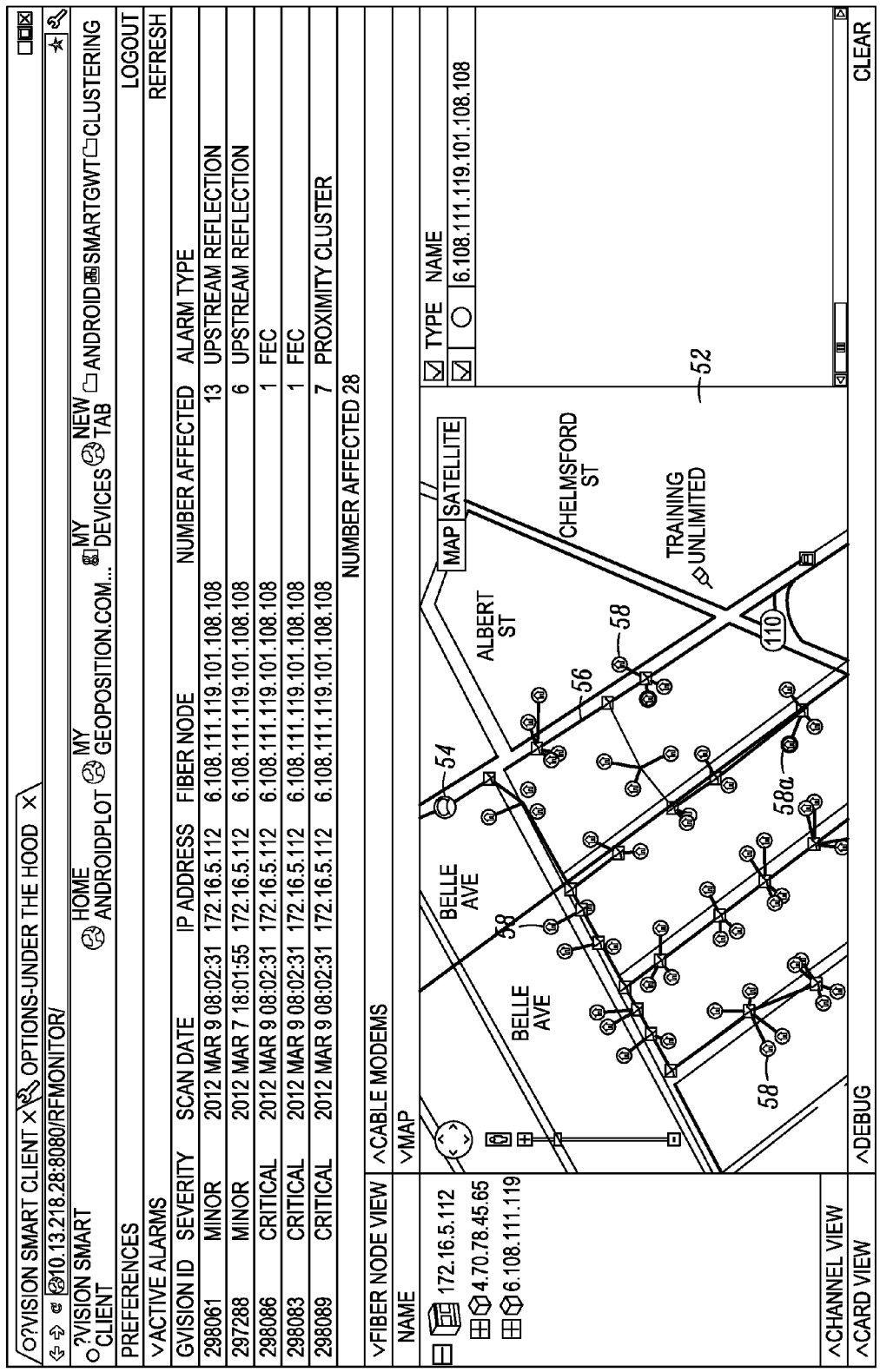
FIG. 7 is a view of a graphical user interface with a local geographic map showing a node location, terminal network elements, network path, and alarms in accordance with an embodiment.
Figure 8:
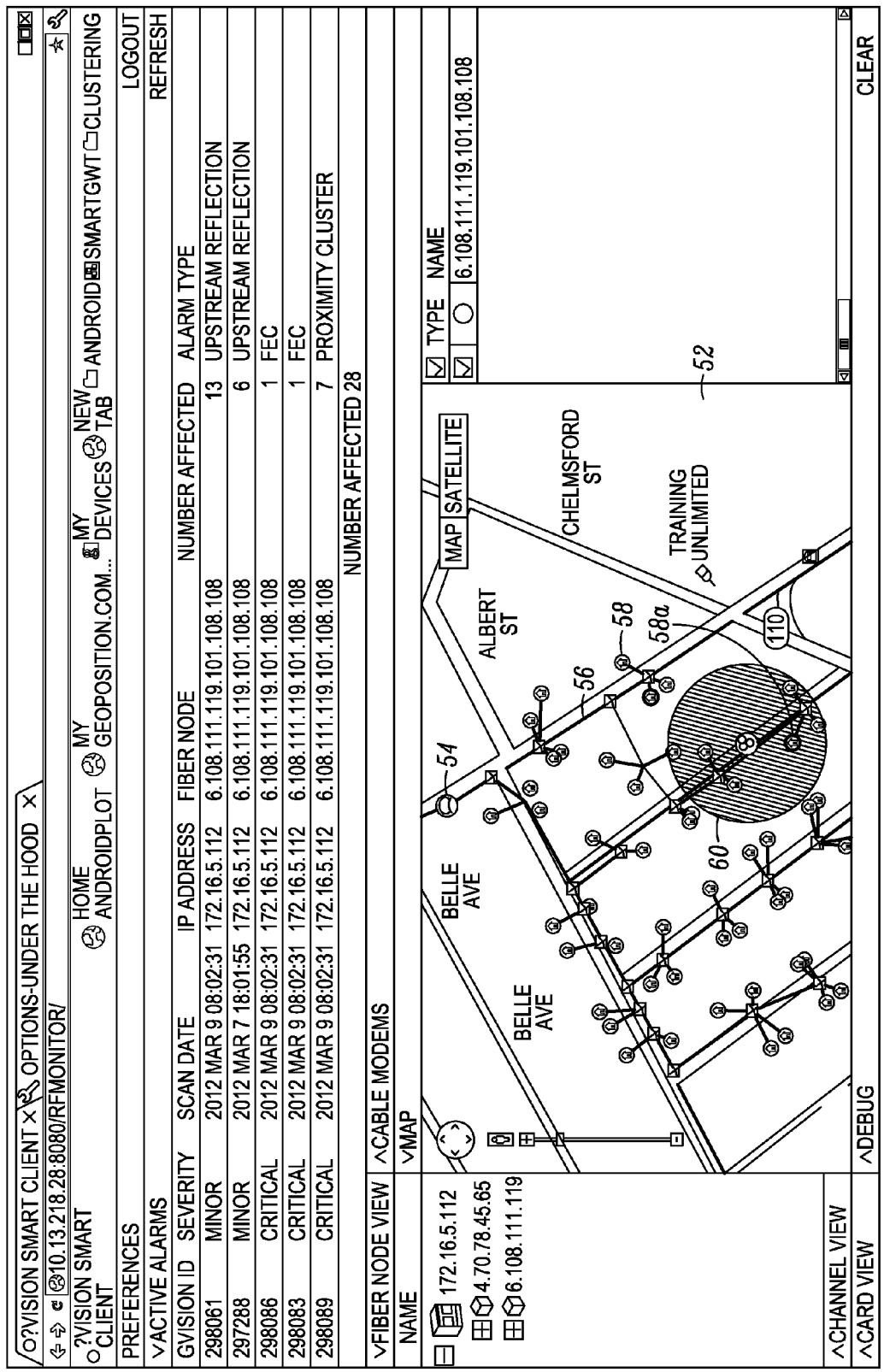
FIG. 8 is a view of a graphical user interface similar to FIG. 7 with a cluster of terminal network elements highlighted based on geo-proximity in accordance with an embodiment.

A more local view of a street map 52 is shown in FIG. 7. Here a single fiber node 54 of the network is shown as is the network path 56 extending from the node 54 to terminal network elements 58, such as cable modems, serviced via the node 54. The shade (or color, etc.) of the terminal networks elements 58 can be used to visually indicate an alarm on the map 52. For instance, terminal network element 58a is shown in a dark shade (or a particularly color, such as red) which may indicate an alarm of critical severity whereas terminal network elements displayed in lighter shades (other colors, such as yellow) may indicate an alarm of a minor severity. This same map 52 can be further investigated as shown in FIG. 8 in which a geo-proximity cluster 60 is shown highlighted. The path 56 of the cable plant may be estimated and shown such as in FIGS. 7 and 8. If desired, the user of the management tool is able to adjust the path 56 or enter in any known network topology information into the management software or tool should the estimated path and view be inaccurate.

Figure 9:
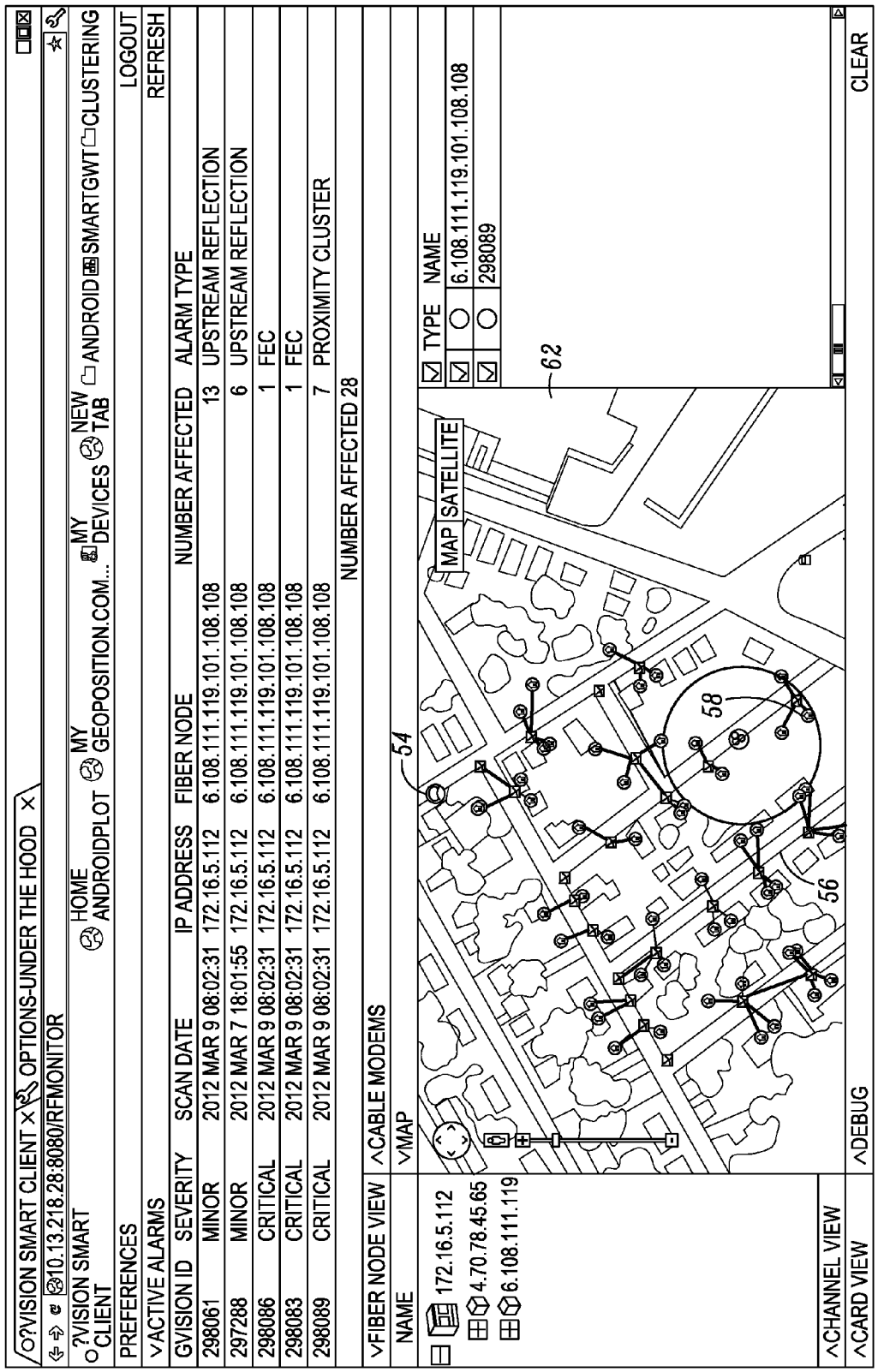
FIG. 9 is a view of a graphical user interface similar to FIG. 8 that is displayed on a satellite image of the geographic area according to an embodiment.
Figure 10:
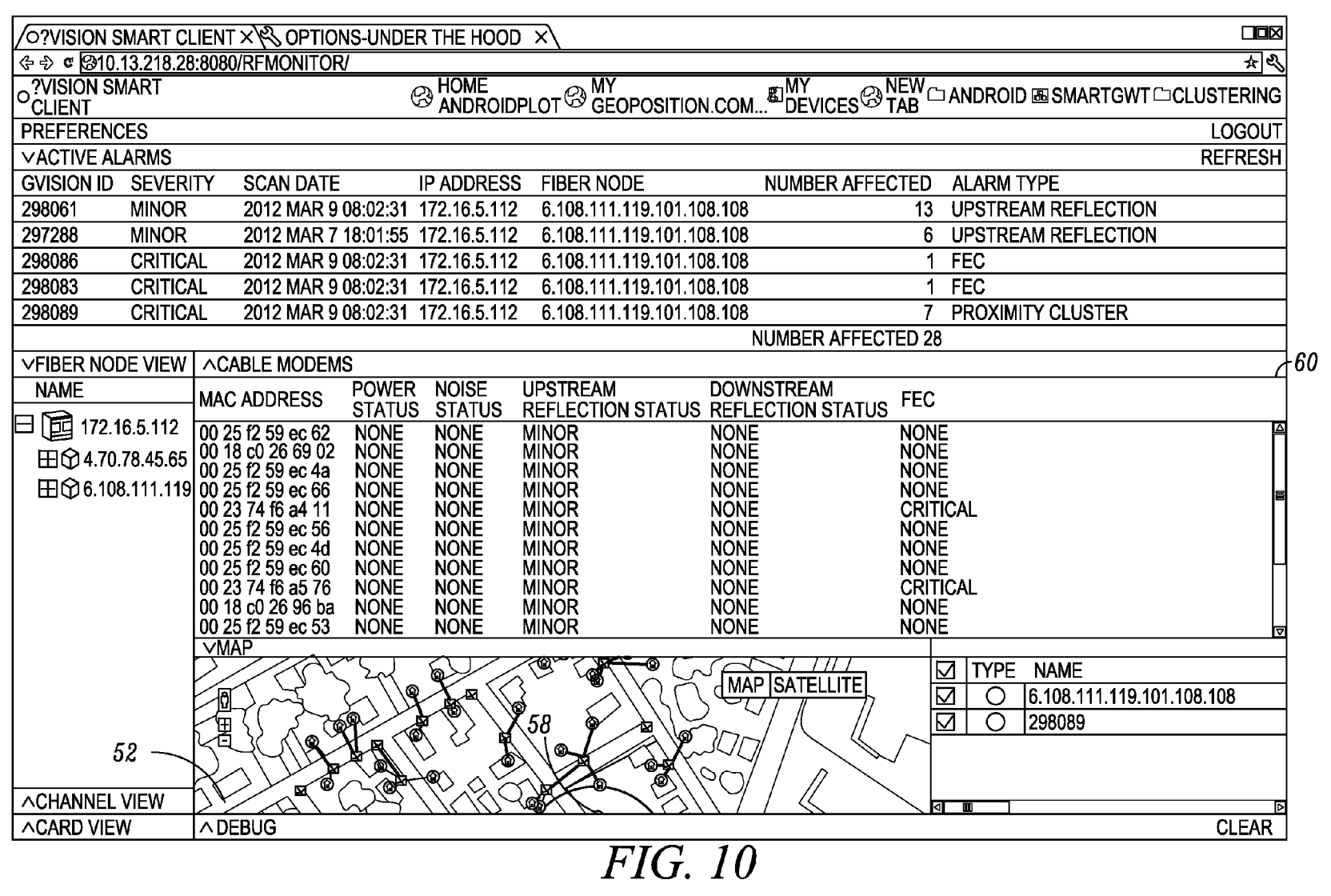
Figure 11:
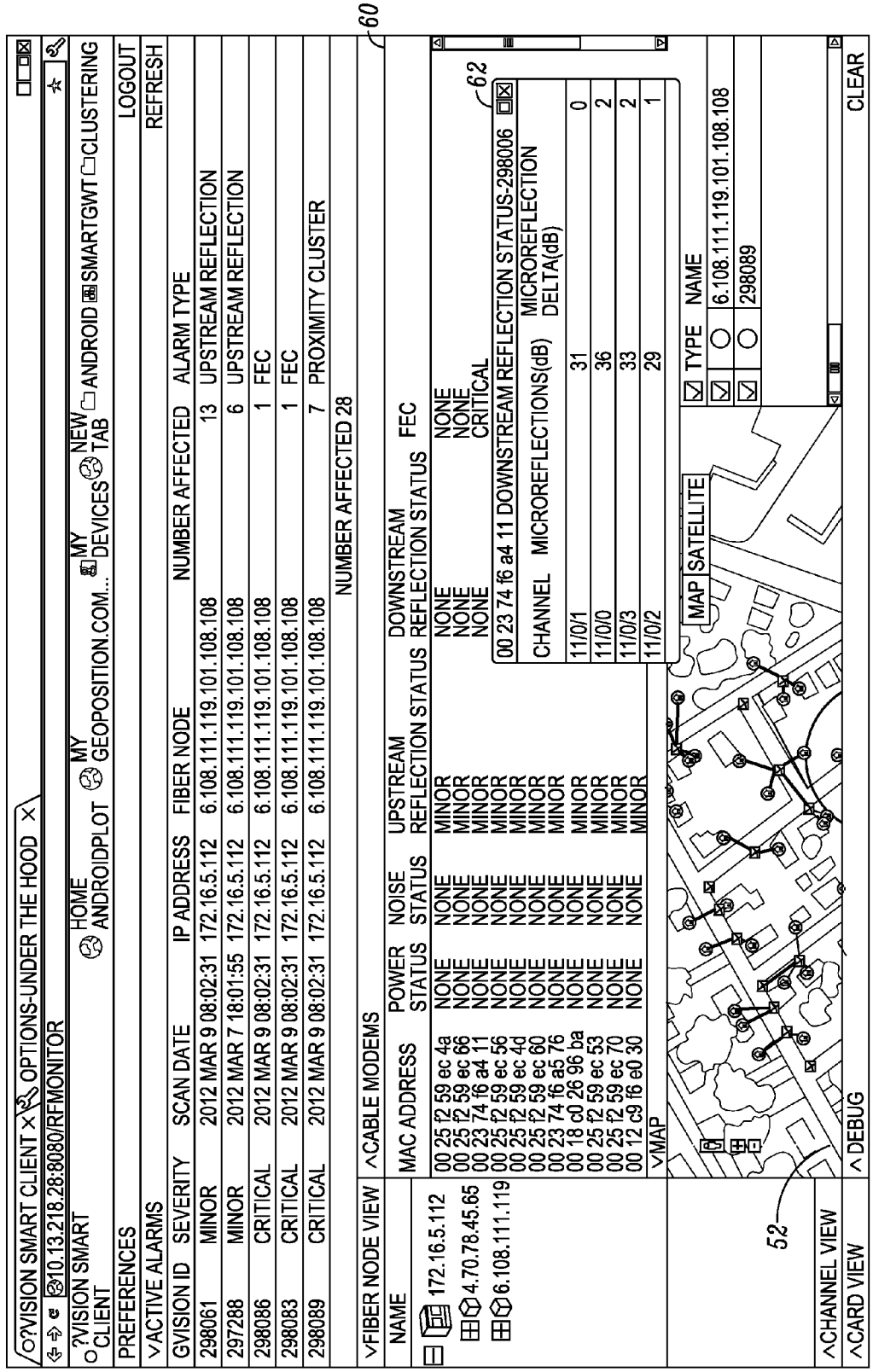
FIG. 11 is a view of a graphical user interface similar to FIG. 10 and including a listing of a particular performance parameter (in this instance, downstream microreflections in dBs for absolute and delta values) for the cable modems displayed on the map and channels used thereby according to an embodiment.

Another view similar to FIG. 7 is shown in the map 62 of FIG. 9. Here the street map 52 has been modified to show actual satellite imagery of the surrounding geographic area. The node 54, path 56, and terminal network elements 58 are overlaid on the satellite imagery as are the alarms and other network topology. For purposes of further investigating a potential network fault, the "cable modems" illustrated in FIG. 9 can be shown in a drop down window 64 such as shown in FIG. 10. Here the MAC address, power status, noise status, upstream reflection status, downstream reflection status, FEC status for each cable modem or terminal network element 58. Some of these cable modems and listed statuses have no alarms whereas others have alarms of "minor" severity while others have alarms of "critical" severity. FIG. 11 shows the ability of the tool to further investigate network issues. Here, measurements corresponding to downstream microreflections in dBs are listed (as absolute and delta values) and shown in a window 66 so that a user may view these or any other values that are or are not the subject of an alarm.

Accordingly, after a network operator center user views the above referenced dashboards and investigates alarms therewith, for instance as shown above, and has identified a particular issue that needs to be resolved, the network monitoring and management tool, software or system can be used to assist the user in sending an appropriate field technician to the correct geographical location. The user can also use the management tool or software to assess the urgency with respect to the need to resolve the issue.

The network monitoring and management system, tool or software can also be used by a service technician in the field. For example, the network monitoring and management software may be run on a remote server that is accessible by the technician such as via a secure wireless web interface. For instance, a mobile device, such as a portable, lap-top, notebook, or tablet computer, a smart phone, or the like may be used to obtain various views, information and maps as discussed above. Accordingly, provided information can be used for rapid, real-time debugging of field issues and provide geographic information, provide real-time monitoring of upstream and downstream performance metrics and error states, and permit a technician to see the interdependency of multiple issues. The above can reduce the need for the technician to access the inside of residences, reduce the number of calls the technician needs to make to the head-end, and enable the technician to update network topology information while in the field. For purposes of this disclosure, "real-time" includes a level of responsiveness that is sufficiently fast to provide meaningful data that reflects current or recent network conditions as well as a level of responsiveness that tolerates a degree of lateness or built-in delay.

Figure 12:
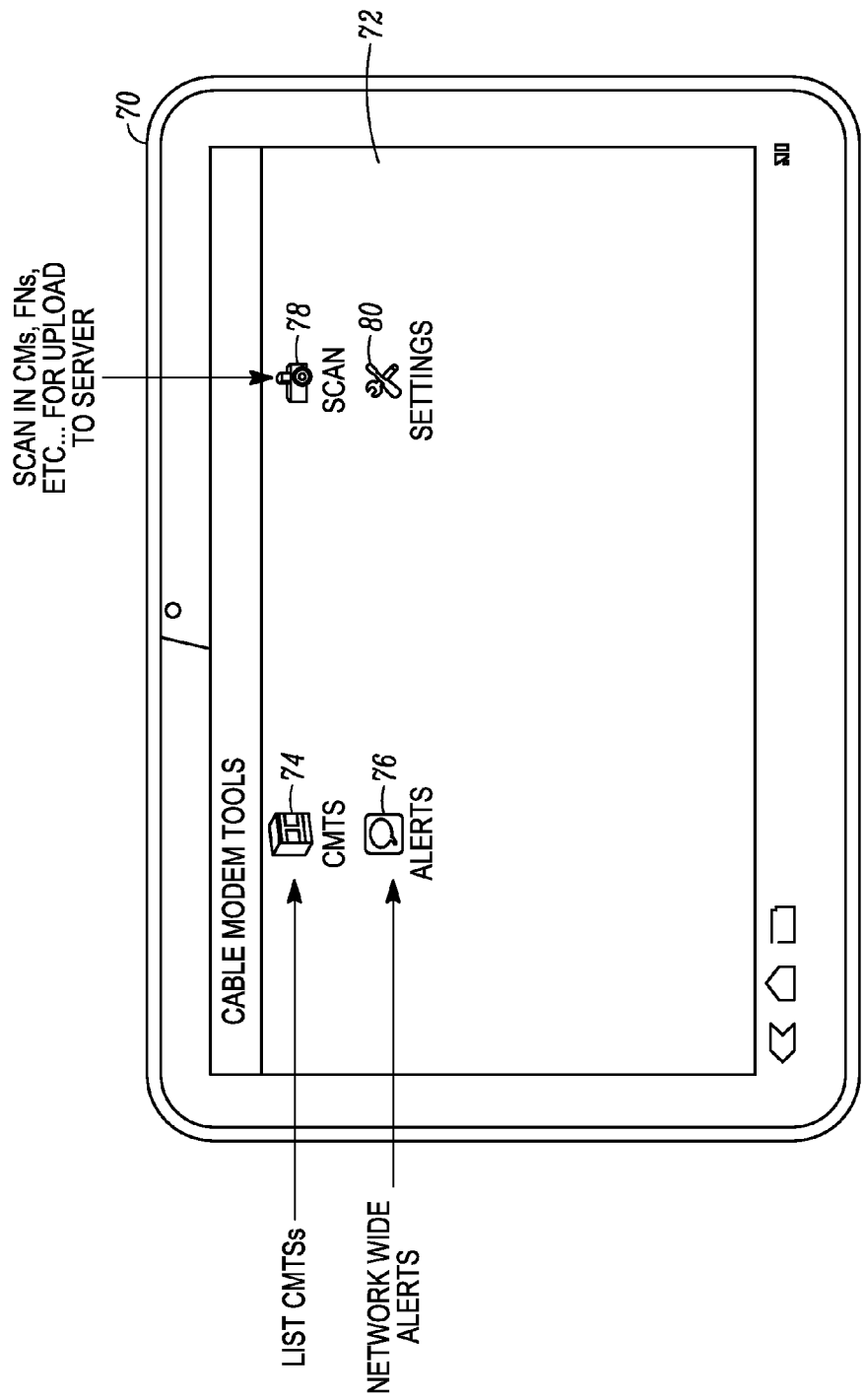
FIG. 12 is a view of a wireless communication tablet having a display screen that may be used by a field technician in accordance with an embodiment.
Figure 13:
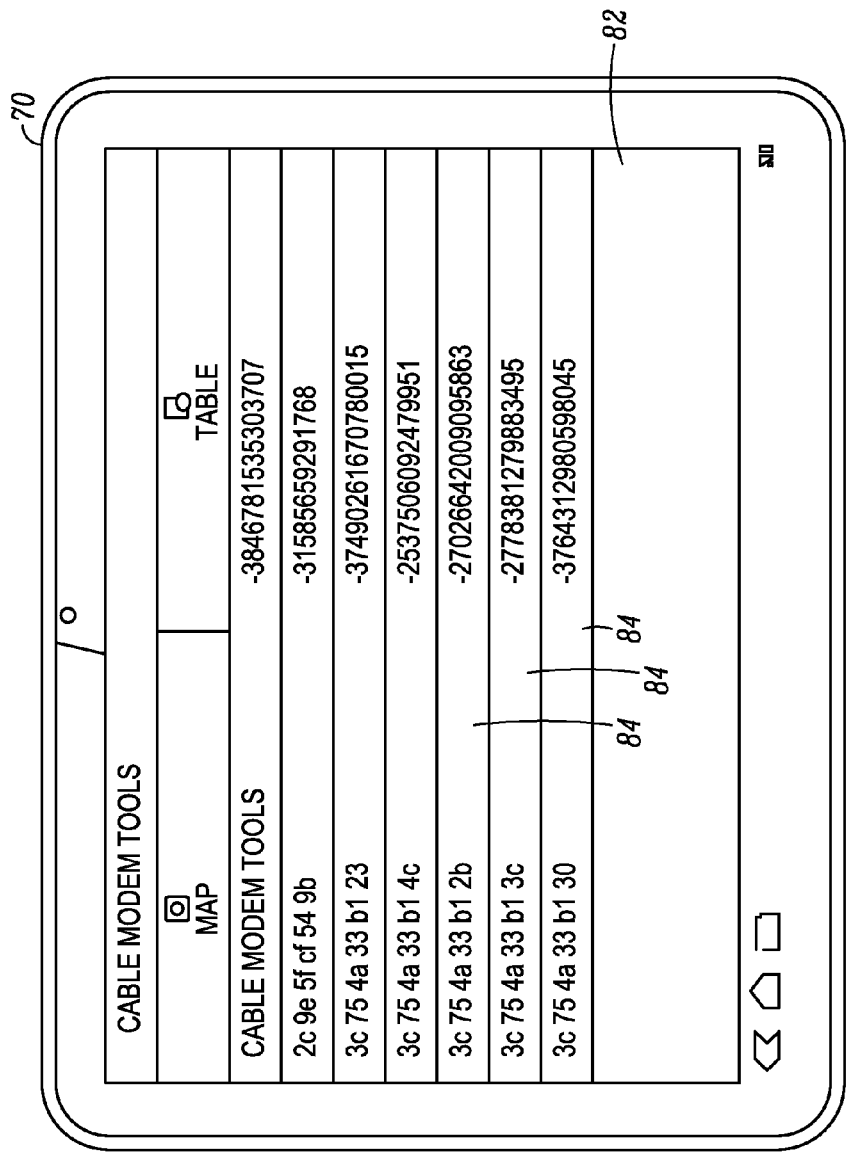
FIG. 13 is a snapshot view of a display screen of the tablet providing a list of faulted modems in accordance with an embodiment.
Figure 14:
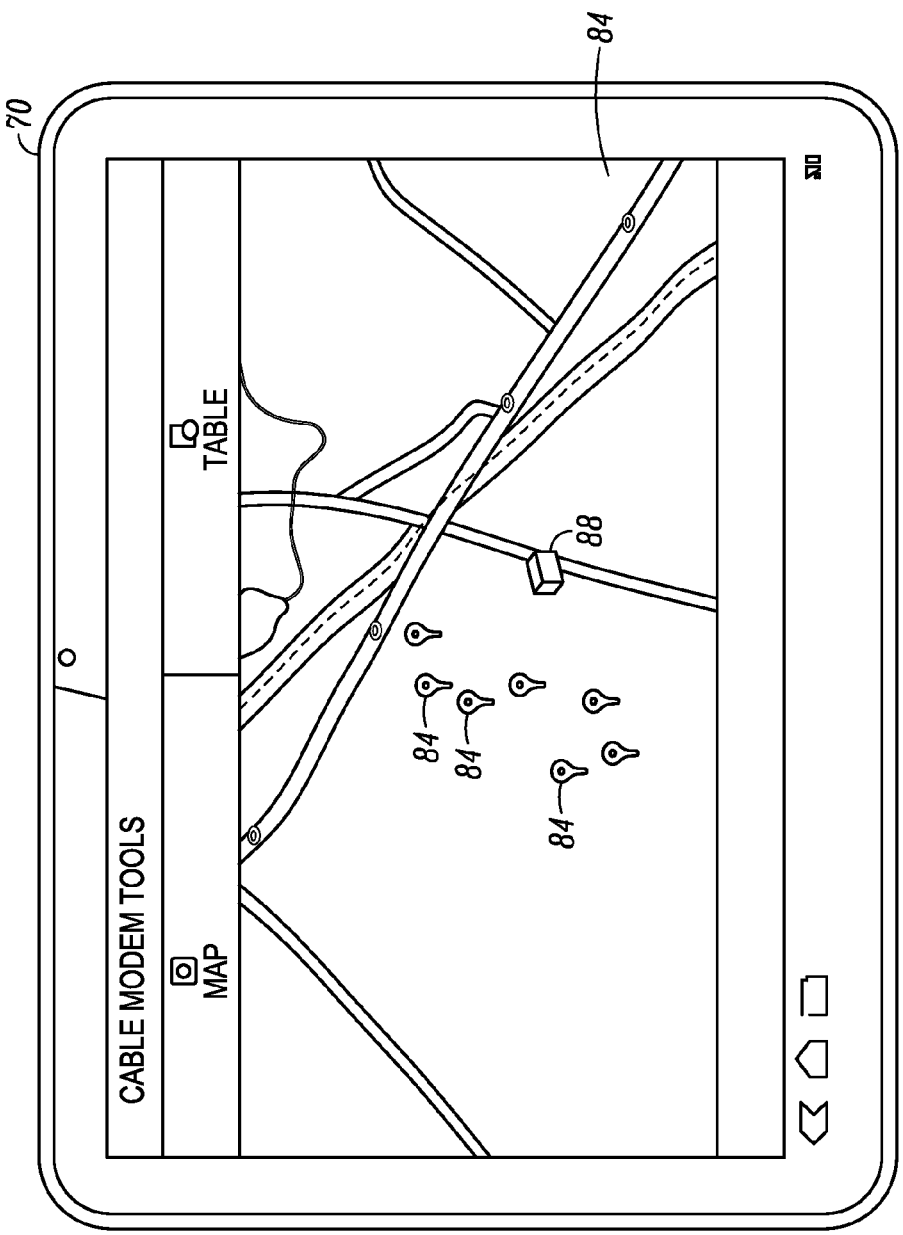
FIG. 14 is a snapshot view of a display screen of the tablet providing the geographic locations of the faulted modems on a street map in accordance with an embodiment.

A tablet 70 is shown in FIGS. 12-14 that may be used by a field technician to connect to the network monitoring and management software. In FIG. 12, the technician is provided with a display 72 that includes an icon 74 for a list of the CMTSs, an icon 76 for network wide alerts, an icon 78 for scanning or uploading information into the system, and a settings icon 80. FIG. 13 shows a display 82 providing a tabular view of network devices 84 having faults, and FIG. 14 shows a display 86 showing the same network devices 84 in a geographical map-style platform with the closest fiber node 88 or like network component. All of the above provides helpful and useful information to the field technician.

Various methods can be used by the network monitoring and management system, software, and tool described above that enables fault determination, fault location, mapping of the network geographically, displaying of faults with and without network topology information, displaying a cluster of network elements impacted by the same fault, and the severity of the fault. For example, a combination of monitored parameters and network topology information can be used to identify the likely physical locations of cable network defects. This approach is able to be implemented in software utilizing numerical analysis. In addition, a combination of sub-algorithms can be used to locate a common network failure point even when several different and potentially, seemingly unrelated, issues are observed.

Often, a single defect within a plant can cause multiple types of impairments to be recognized which may otherwise appear to be independent and arise from separate issues. Each of these impairments may trigger multiple, independent fault detection mechanisms within the network monitoring tool. However, not all of the fault detection algorithms may identify the same network element as a primary fault location (i.e. a location estimated to be the most likely point or source of the fault). However, the results of all of these independent fault detection/identification algorithms can be viewed together in an effort to significantly improve the accuracy of identifying a root cause of an issue in the presence of multiple fault signatures.

According to an embodiment, the above referenced network monitoring tool can be configured to automatically evaluate groups of separate issues affecting a set of cable modems sharing common network components to quickly and accurately identify a root cause of a particular issue. Thus, a grouping of otherwise seemingly unrelated alarms is analyzed, and a determination is made with respect to whether or not the issues might actually be related. If a relation is found, the relation is shown on a map or provided in an alternate form (such as within a listing) so that the root cause can be quickly located and addressed. Each alarm within the grouping is assessed and analyzed independently, and then the results are evaluated as a set to accurately locate the issue within the plant. In this manner, a plurality of alarm topologies is considered, and then a single accurate inspection list is generated for the root cause issue.

By way of example, the following algorithm may be used to prioritize fault location based upon the occurrence of multiple alarms. First, all active threshold alarms that may be associated with a particular fiber node being evaluated are automatically retrieved. Each alarm associated with the fiber node is evaluated independently with respect to estimated fault location on the network. Two or more of the alarms are considered to be part of the same issue if they share any fault topology points in common. Thereafter, an inspection list is generated and prioritized based on a priority ranking for each particular type of alarm (i.e., highest priority alarm, second highest, third highest, etc. . . . ). Here, the estimation as to fault location may be different depending upon the type of alarm and algorithm for such an alarm that is used.

The inspection points for each alarm are scored based upon their priority ranking. Simply for purposes of example, the highest priority alarm associated with each alarm may receive a score of ten (10) points and a second highest priority alarm for each alarm may receive a score of nine (9) points. Thereafter, all of the scores for a given inspection point (across all of the alarm types) are then added up and this sum total is assigned to the inspection point. The inspection point with the highest point totals is then given the highest priority as the root cause issue of all the alarms, the inspection point with the second highest point total is given the second highest priority as the root cause issued of all alarms, and so forth. Here, a point system is disclosed by way of example and the disclosed point system could be replaced by any type of point value system and/or ranking system involving letter grades or the like.

For purposes of providing an example with respect to the above described algorithm, four different alarm topologies 100, 102, 104 and 106 associated with a single plant defect and the same part of a network is shown in FIGS. 15-18. In each of these topologies 100, 102, 104 and 106, the physical location of a network fault may be estimated by receiving different types of information via data pulls including information concerning network components and geographic locations of the network components and terminal network elements and geographic locations of the terminal network elements. The existence of a network fault within the network can be automatically and electronically detected by monitoring various performance parameters, for instance, obtained via upstream communications from terminal network elements on the network.

A physical location of the network fault on the network may be estimated based on the particular performance parameter detected, the information of the physical topology of the network obtained, and the terminal network element or elements from which the performance parameter was received that indicated the network fault. Thereafter, a list of network components that may require inspection and may provide a source of the network fault can be automatically generated based on analysis of the performance parameter. By way of example, the listed network components may include drop cables, taps, trunk cables, splitters, amplifiers, nodes, and like components and the types of performance parameters may include downstream or upstream signal-to-noise ratio (SNR), absolute and delta downstream power (DS Power) level, absolute and delta upstream power (US Power) level, upstream echo (US Echo) level, downstream micro-reflection (DS Micro) level, upstream filter coefficient ratio, carrier-to-noise ratio (CNR), and modulation error ratio (MER).

For purposes of example, the network shown in FIGS. 15-20 may be a hybrid fiber-coaxial (HFC) network which interconnects terminal network elements, such as cable modems, to a headend (not shown) of the network having a cable modem termination system (CMTS) (not shown) via a tree and branch network structure. The upstream communications are herein defined as communications transmitted in a direction from the terminal network elements toward the headend.

A geographically-accurate map may be automatically and electronically populated with the geographic locations of network components to which a network fault is attributed, a geographic location of each the terminal network elements impacted by the network fault, and a diagnostic alarm identifying the network fault. The map may be displayable, for instance, with the use of geospatial software.

Different algorithms are used in each of the topologies 100, 102, 104 and 106 of FIGS. 15-18 to estimate the physical location of a fault. For this purpose, data is automatically gathered in real time and/or with an acceptable amount of delay by the CMTS, a server, or other equipment from cable modems in use by subscribers in the network to locate issues within the cable plant. As shown in FIGS. 15-18, a plurality of cable modems 110 are shown connected in tree and branch architecture via a node 112 which connects to the headend (not shown) of the network. The tree and branch architecture defines the path the network follows to each cable modem 110 and common network components on the network that may be shared by different subsets of cable modems.

Figure 15:
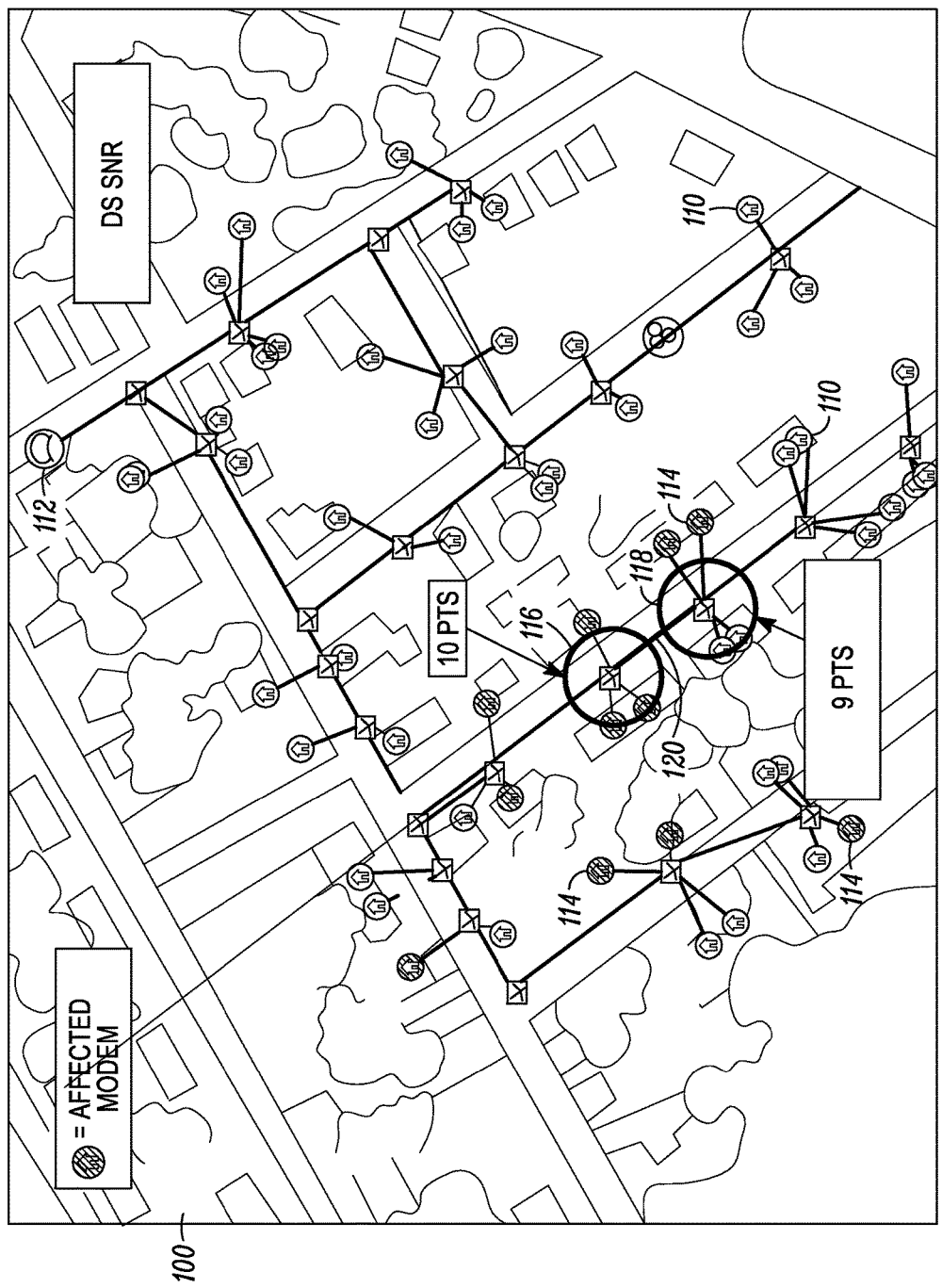
FIG. 15 is a view of a section of a network extending downstream from a fiber-optic node and in which cable modems affected by downstream signal-to-noise ratio at threshold levels are shown in accordance with an embodiment.

In FIG. 15, a plurality of the modems 114 is identified in a part of the network as having unacceptable downstream signal-to-noise-ratio (DS SNR) levels. Based on an analysis of the DS SNR data, it is determined that taps and splitter identified by the circle 116 represents the most likely source of the DS SNR issue. Thus, for example, this location may be assigned a value of ten (10) points. Likewise, the taps and splitter identified by the circle 118 may be determined to be the second most likely source of the DS SNR issue. Thus, for example, this location may be assigned a value of nine (9) points. The third most likely source of the issue shown in FIG. 15 is the cable 120 extending between the two above referenced splitters.

Figure 16:
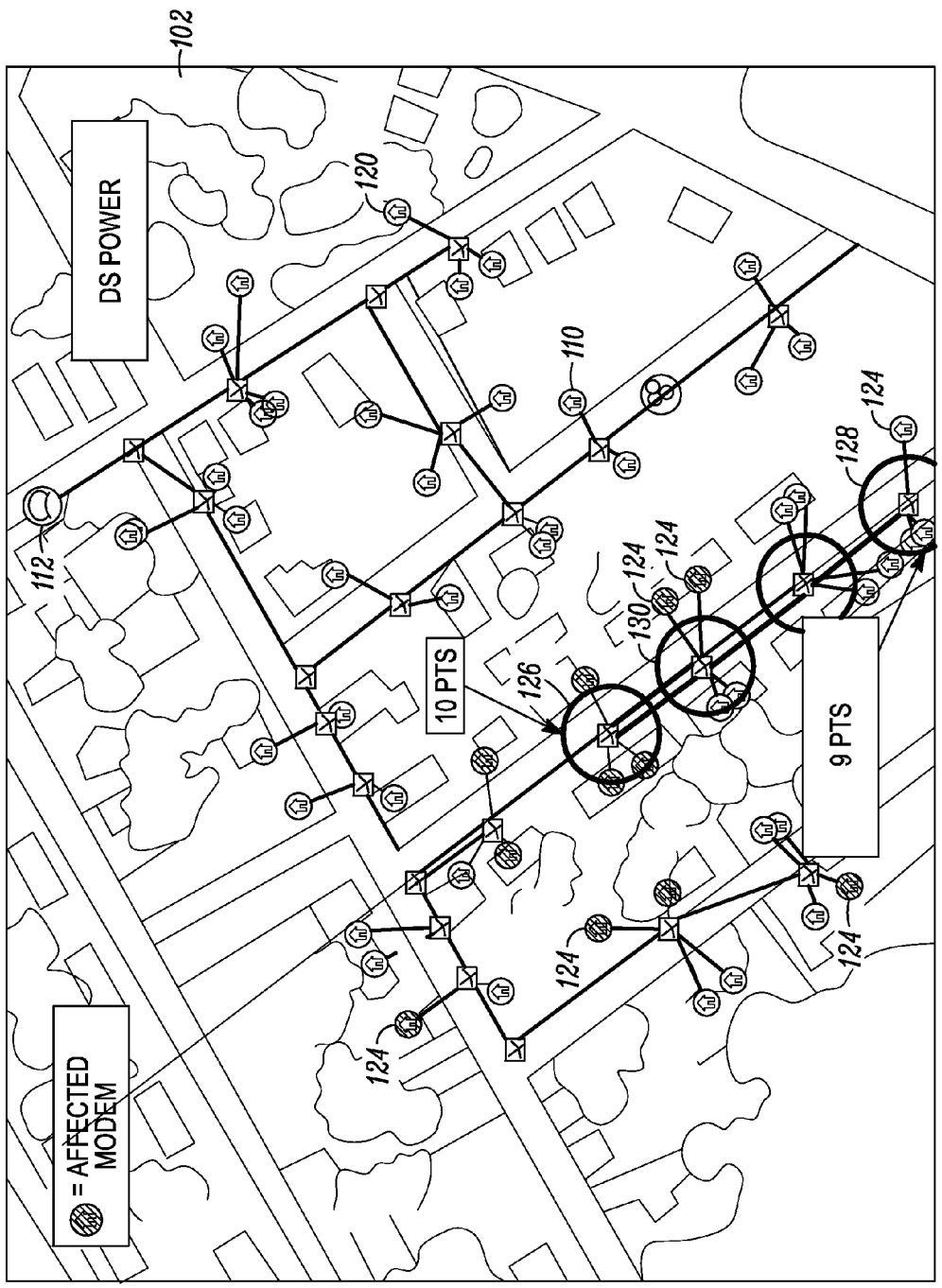
FIG. 16 is a view of the same section of the network as FIG. 15 in which cable modems affected by downstream power at threshold levels are shown in accordance with an embodiment.

In FIG. 16, a number of the modems 124 in the same part of the network is identified as having unacceptable downstream power (DS Power) levels. Based on an analysis of the DS Power data, it is determined that taps and splitter identified by the circle 126 represents the most likely source of the DS Power issue. Thus, for example, this location may be assigned a value of ten (10) points. Likewise, the taps and splitter identified by the circle 128 may be determined to be the second most likely source of the DS Power issue. Thus, for example, this location may be assigned a value of nine (9) points. The third most likely source of the issue shown in FIG. 16 is the splitter and taps referenced by circle 130.

Figure 17:
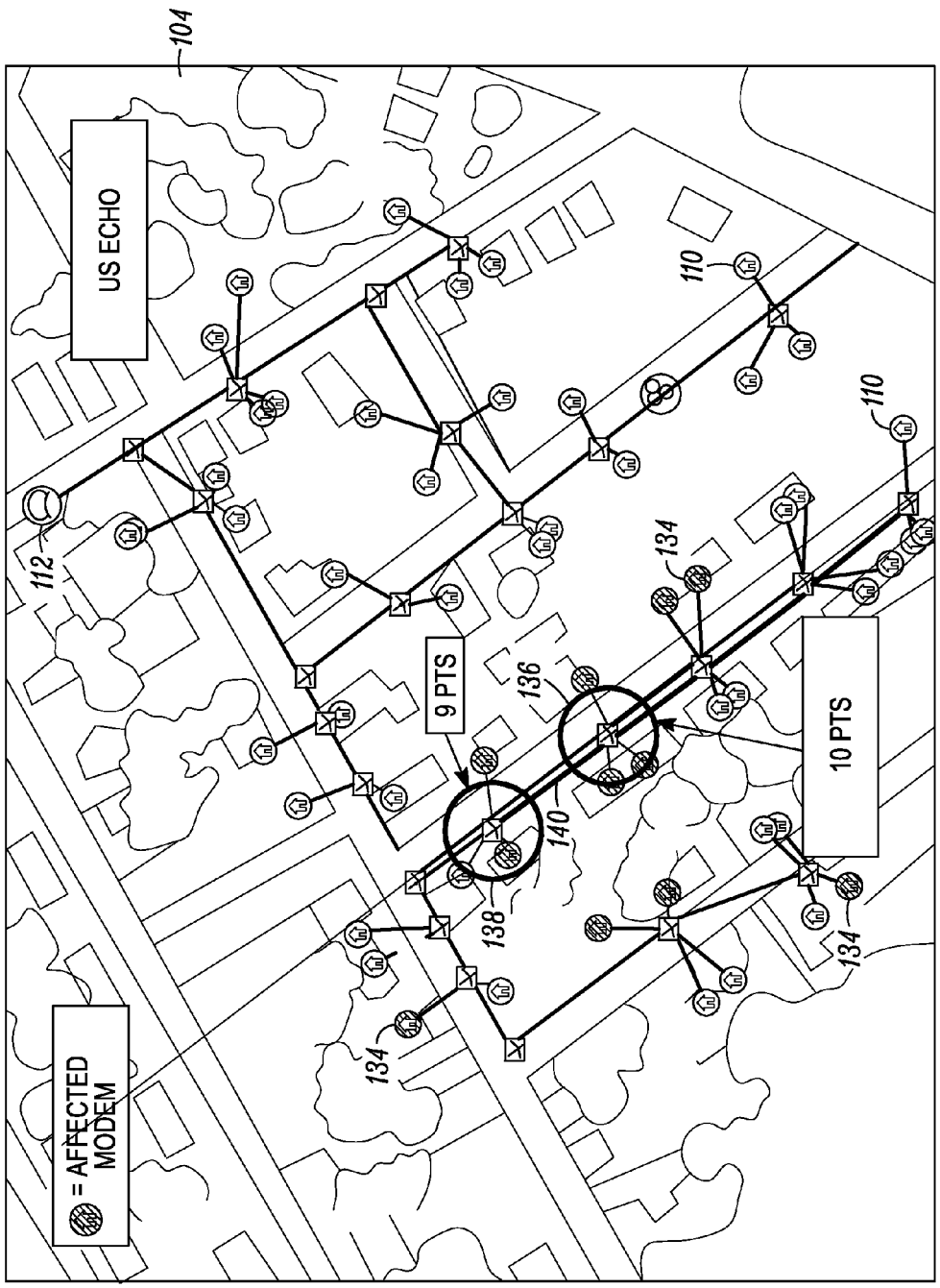
FIG. 17 is a view of the same section of the network as FIG. 15 in which cable modems affected by upstream echo at threshold levels are shown in accordance with an embodiment.

In FIG. 17, a number of the modems 134 in the same part of the network is identified as having unacceptable upstream echo (US Echo) levels. Based on an analysis of the US Echo data, it is determined that taps and splitter identified by the circle 136 represents the most likely source of the US Echo issue. Thus, for example, this location may be assigned a value of ten (10) points Likewise, the taps and splitter identified by the circle 138 may be determined to be the second most likely source of the US Echo issue. Thus, for example, this location may be assigned a value of nine (9) points. The third most likely source of the issue shown in FIG. 17 is the cable 140 extending between the above referenced splitters.

Figure 18:
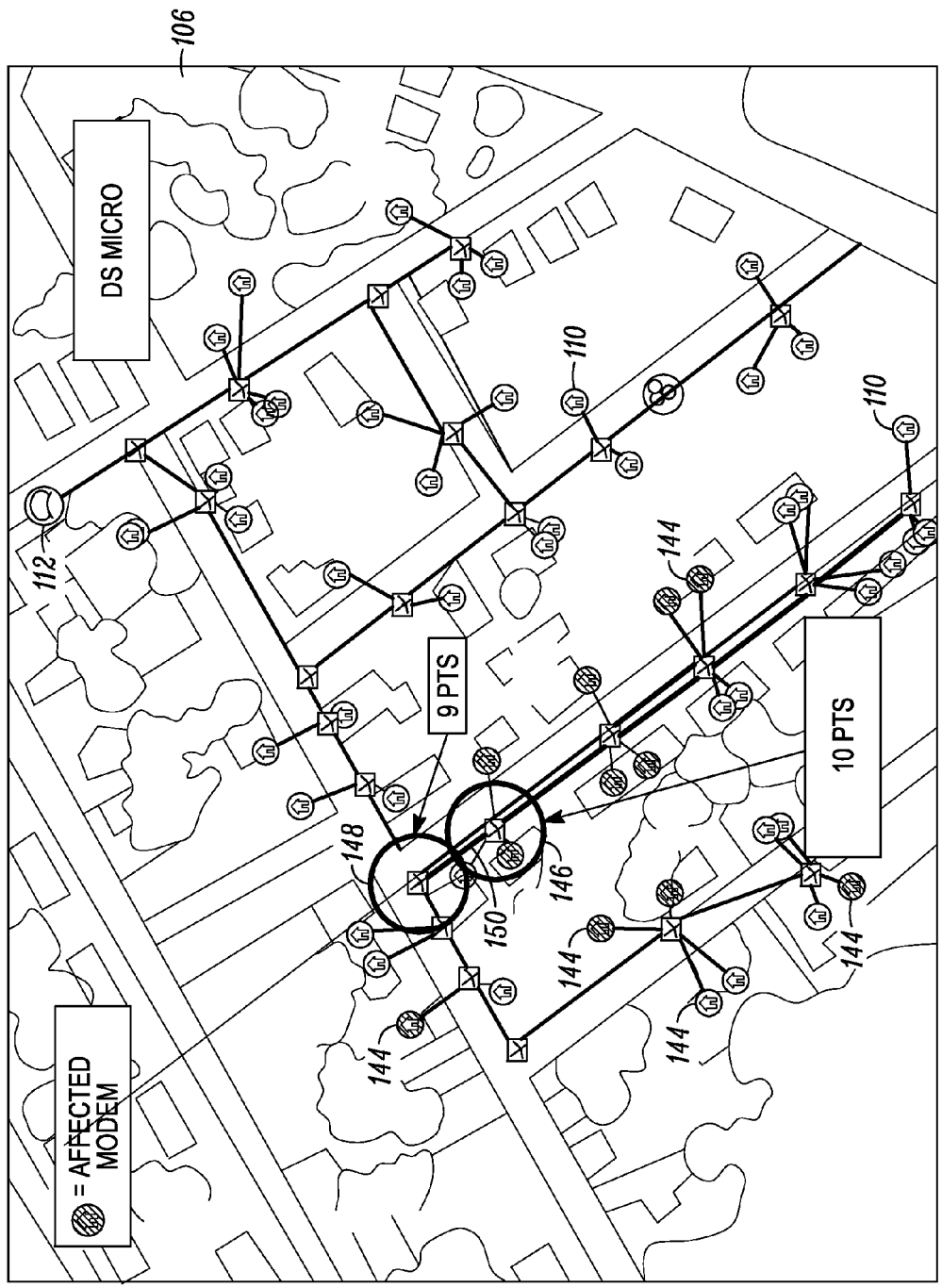
FIG. 18 is a view of the same section of the network as FIG. 15 in which cable modems affected by downstream micro-reflection at threshold levels are shown in accordance with an embodiment.

Finally, in FIG. 18, a number of the modems 144 in the same part of the network is identified as having unacceptable downstream microreflection (DS Micro) levels. Based on an analysis of the DS Micro data, it is determined that taps and splitter identified by the circle 146 represents the most likely source of the DS Micro issue. Thus, for example, this location may be assigned a value of ten (10) points Likewise, the taps and splitter identified by the circle 148 may be determined to be the second most likely source of the DS Micro issue. Thus, for example, this location may be assigned a value of nine (9) points. The third most likely source of the issue shown in FIG. 18 is the cable 150 extending between the above referenced splitters.

As shown in the example of above, the four topologies 100, 102, 104 and 106 identify alarms based on different cable modem performance parameters (i.e., for DS SNR, DS Power, US Echo, and DS Micro) that may not be separate issues and that be associated with a single plant defect or root cause. As shown in FIGS. 15-18, the analysis of each of the different parameter (regardless of algorithm utilized) produces different priority lists with respect to the location that represents the first, second and third most likely locations of the fault. As also shown in FIGS. 15-18, points can be assigned to each of the top two highest priority inspection points in each topology (in this example, ten points for the highest priority inspection point and nine points for the second highest inspection point).

Figure 19:
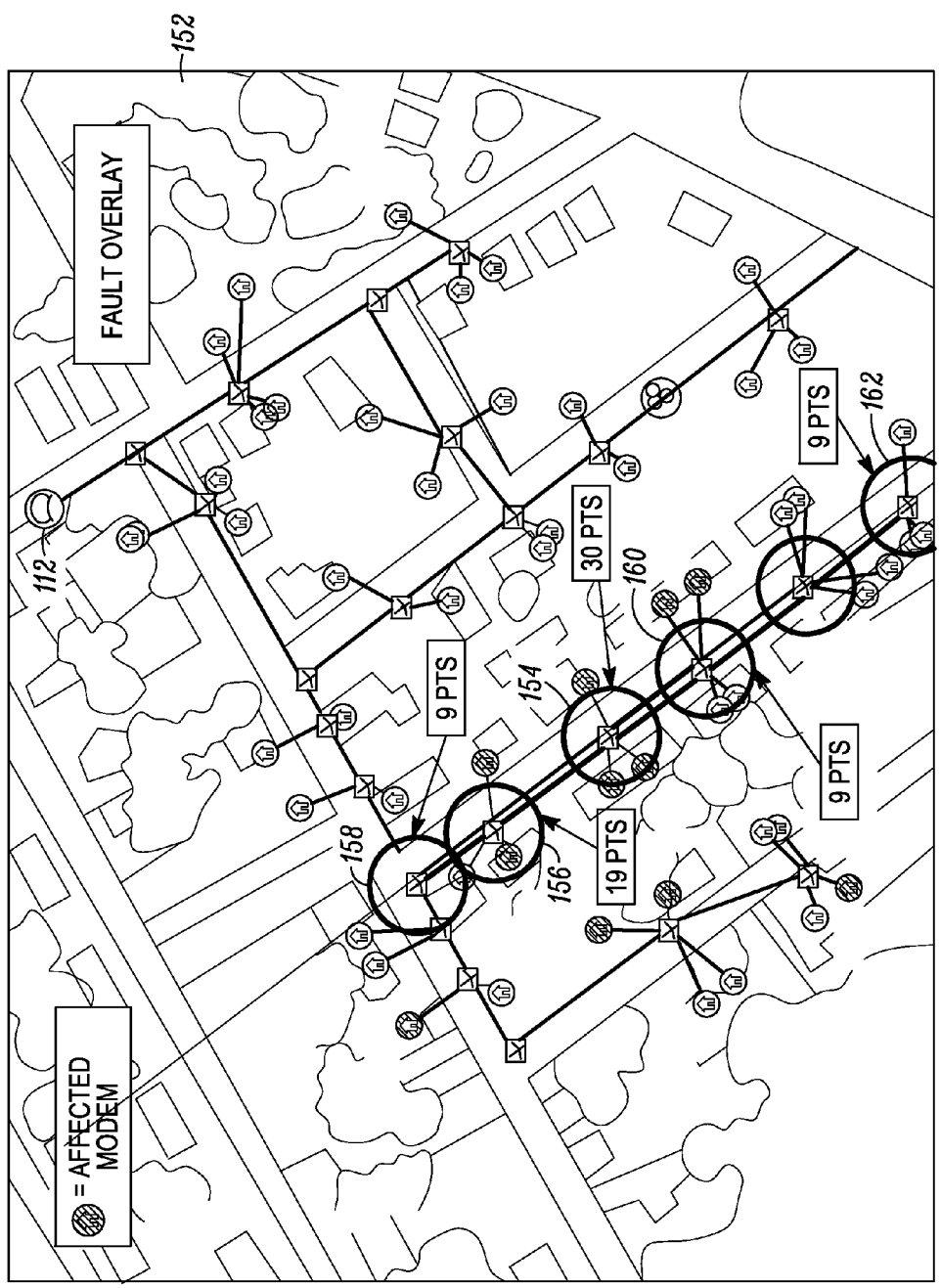
FIG. 19 is a fault overlay view in which the estimated fault locations shown in FIGS. 15-18 are combined in a single topology image in accordance with an embodiment.

In FIG. 19, each of the alarm topology scores discussed above with respect to topologies 100, 102, 104 and 106 and FIGS. 15-18 are totaled at each corresponding inspection point to create a topology map 152 in which an overall priority ranking based on a combination of the analysis performed independently for each of the DS SNR, DS Power, US Echo and DS Micro cable modem performance parameters. This essentially combines these four separate fault location determinations to provide an overall presentation of the problem. As shown in FIG. 19, inspection point 154 received thirty points, inspection point 156 received nineteen points, and each of inspection points 158, 160 and 162 received nine points.

Figure 20:
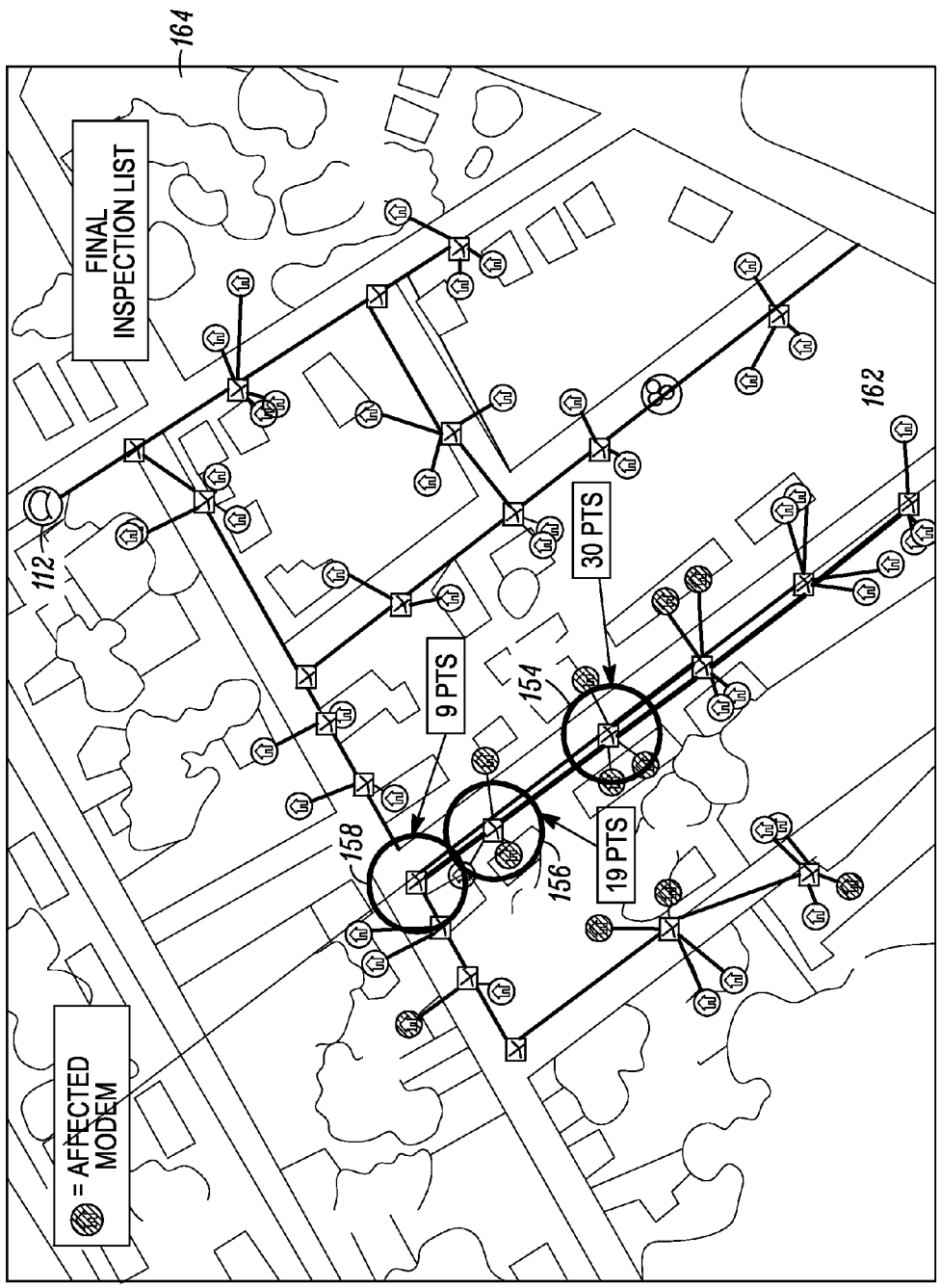
FIG. 20 is a topology image displaying a final prioritized inspection list for potential fault locations for the network shown in FIGS. 15-19 in accordance with an embodiment.

FIG. 20 provides a final topology map 164 identifying a final inspection list. According to the above described algorithm, inspection point 154 is identified as a location of the most likely source of the issue. In addition, inspection point 156 is shown as being the second most likely location of the issue, and inspection point 158 is shown as being the third most likely source of the fault or defect. Here, although inspection points 158, 160 and 162 each received the same amount of points, inspection point 158 is given priority over inspection points 160 and 162 since inspection point 158 is located further upstream and closest to the node 112.

Figure 21:
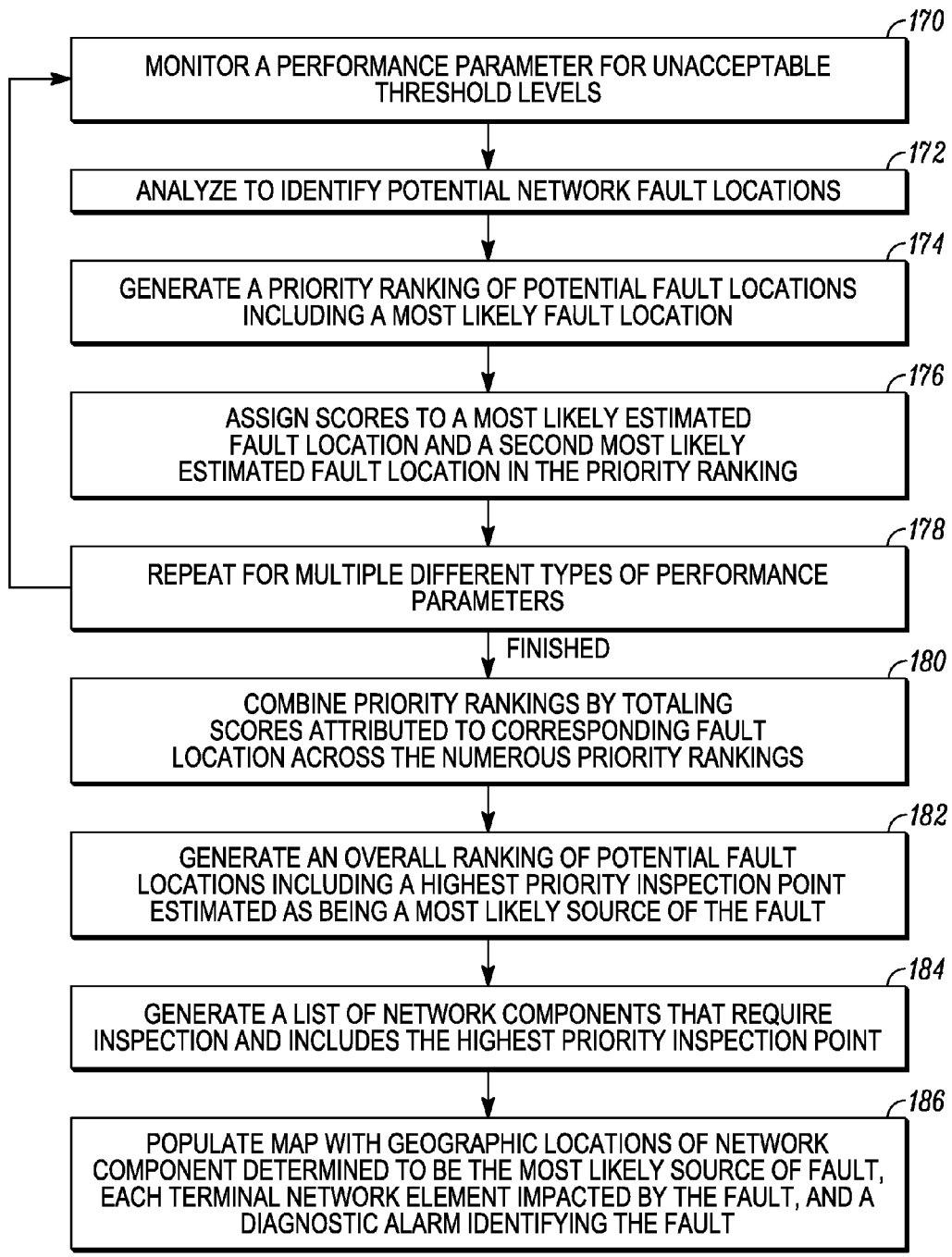
FIG. 21 is a flowchart of a method of estimating and prioritizing a location of a defect within a network in accordance with an embodiment.

FIG. 21 provides a flowchart for the above referenced algorithm using fault signature overlay to prioritize network locations/components to be inspected in view of issues detected based on different performance parameters for cable modems served by a common node. In step 170, a first performance parameter is monitored for alarms with respect to unacceptable threshold levels via communications with a set of terminal network elements, such as cable modems, on the network. The performance parameter reported by the alarm is analyzed in step 172 to identify potential network fault locations on the network. In step 174, a priority ranking of potential network fault locations including a most likely estimated fault location is generated, and scores of predetermined values are assigned in step 176 to at least the most likely estimated fault location and a second most likely estimated fault location within the priority ranking for the performance parameter.

Thereafter, in step 178, the above referenced steps are repeated a number of times for different types of performance parameters. As examples of performance parameters, any of the following may be monitored and analyzed: downstream or upstream signal-to-noise ratio (SNR); absolute and delta downstream power (DS Power) level; absolute and delta upstream power (US Power) level; upstream echo (US Echo) level; downstream micro-reflection (DS Micro) level; upstream filter coefficient ratio; carrier-to-noise ratio (CNR); and modulation error ratio (MER).

After all desired performance parameters have been monitored, analyzed, and used to generate and apply scores to priority rankings, the plurality of priority rankings can be combined. For example, the scores attributed to each corresponding potential network fault location given by the plurality of priority rankings can be totaled. See step 180. From this information, an overall priority ranking can be generated which includes at least a highest priority inspection point estimated as being a most likely source of a fault on the network. See step 182. Thereafter, if desired, a list of network components that require inspection and that includes the highest priority inspection point estimated as being the most likely source of the fault on the network can be generated. See step 184. As a further option, a geographically-accurate map can be populated with a geographic location of a network component determined to be the most likely source of the fault, a geographic location of each the terminal network elements impacted by the network fault, and a diagnostic alarm identifying the network fault (see step 186) and displayed.

A signal processing electronic device, such as a server, remote server, CMTS or the like can run a software application to provide the above process steps and analysis. In addition, a non-transitory computer readable storage medium having computer program instructions stored thereon that, when executed by a processor, cause the processor to perform the above discussed operations can also be provided.

The above referenced signal processing electronic devices for carrying out the above methods can physically be provided on a circuit board or within another electronic device and can include various processors, microprocessors, controllers, chips, disk drives, and the like. It will be apparent to one of ordinary skill in the art the modules, processors, controllers, units, and the like may be implemented as electronic components, software, hardware or a combination of hardware and software.

While the principles of the invention have been described above in connection with specific networks, devices, apparatus, systems, and methods, it is to be clearly understood that this description is made only by way of example and not as limitation on the scope of the invention as defined in the appended claims.

We claim:

1. A method of prioritizing estimated fault locations within a network, comprising the steps of:
   in at least one processor communicatively coupled to the network, monitoring a plurality of different performance parameters for unacceptable threshold levels via communications with a set of terminal network elements on the network;
   in the at least one processor, separately analyzing each one of the plurality of different performance parameters identifying unacceptable threshold levels to identify potential network fault locations on the network;
   in the at least one processor, generating a plurality of priority rankings of potential network fault locations, each of the plurality of priority rankings associated respectively with a most likely estimated fault location, and each of the plurality of priority rankings being determined from a different one of the plurality of different performance parameters identifying unacceptable threshold levels; and
   in the at least one processor, combining information of each of the plurality of priority rankings to generate an overall priority ranking of potential network fault locations, wherein the overall priority ranking is associated with at least a highest priority inspection point, and wherein generating the overall priority ranking further includes estimating that one of the potential network fault locations is a most likely source of a fault on the network, and identifying said most likely source of a fault on the network as being the highest priority inspection point.

2. A method according to claim 1, further comprising the step of, for each of the plurality of priority rankings, assigning scores of pre-determined values to at least the most likely estimated fault location and a second most likely estimated fault location.

3. A method according to claim 2, wherein said combining step includes a step of totaling the scores attributed to each corresponding potential network fault location across the plurality of priority rankings to generate the overall priority ranking.

4. A method according to claim 3, wherein, for different potential network fault locations having an equal score as determined during said totaling step, a potential network fault location that is most upstream on a network path relative to a node component is assigned a higher ranking than other potential network fault locations having the equal score.

5. A method according to claim 1, further comprising a step of automatically generating a list of network components that require inspection and that includes at least the highest priority inspection point.

6. A method according to claim 1, wherein the set of terminal network elements includes terminal network elements sharing at least one of the potential network fault locations in common.

7. A method according to claim 4, wherein the set of terminal network elements are connected to a headend of the network via a common node of the network via paths arranged in a tree and branch network structure.

8. A method according to claim 1, further comprising the step of receiving information electronically of a physical topology of the network.

9. A method according to claim 8, wherein said receiving step including data pulls of information concerning network components and geographic locations of the network components and terminal network elements and geographic locations of the terminal network elements.

10. A method according to claim 9, further comprising the step of automatically and electronically populating a geographically-accurate map with a geographic location of a network component determined to be the most likely source of the fault, a geographic location of each the terminal network elements impacted by the network fault, and a diagnostic alarm identifying the network fault.

11. A method according to claim 10, further comprising the step of displaying the map with geospatial software.

12. A method according to claim 9, wherein the network components are selected from a group consisting of drop cables, taps, trunk cables, amplifiers, splitters, and node components.

13. The method according to claim 1, wherein the network is a cable network interconnecting the terminal network elements which include cable modems to a headend of the network having a cable modem termination system (CMTS), and wherein the communications include upstream communications in a direction from the terminal network elements to the headend.

14. The method according to claim 1, wherein a performance parameter of the plurality of different performance parameters monitored comprises one of: a downstream signal-to-noise ratio, an upstream signal-to-noise ratio, an absolute and delta downstream power level, an absolute and delta upstream power level, an upstream echo level, a downstream micro-reflection level, an upstream filter coefficient ratio, a carrier-to-noise ratio, and a modulation error ratio.

15. A signal processing electronic device for prioritizing estimated fault locations within a network, comprising at least one processing unit configured to:
    monitor a plurality of different performance parameters for unacceptable threshold levels via communications with a set of terminal network elements on the network;
    separately analyze each one of the plurality of different performance parameters identifying unacceptable threshold levels to identify potential network fault locations on the network;
    generate a plurality of priority rankings of potential network fault locations, each of the plurality of priority rankings associated respectively with a most likely estimated fault location, and each of the plurality of priority rankings being determined from a different one of the plurality of different performance parameters identifying unacceptable threshold levels; and
    combine information of each of the plurality of priority rankings to generate an overall priority ranking of potential network fault locations, wherein the overall priority ranking is associated with at least a highest priority inspection point, and wherein to generate the overall priority ranking further includes to estimate that one of the potential network fault locations is a most likely source of a fault on the network, and to identify said most likely source of a fault on the network as being the highest priority inspection point.

16. A signal processing electronic device according to claim 15, the at least one processing unit being further configured to:
    assign scores of pre-determined values to at least the most likely estimated fault location and a second most likely estimated fault location for each of the plurality of priority rankings and being configured to total the scores attributed to each corresponding potential network fault location across the plurality of priority rankings to generate the overall priority ranking.

17. A signal processing electronic device according to claim 15, the at least one processing unit being further configured to:
    automatically generate a list of network components that require inspection and that includes the at least highest priority inspection point estimated as being the most likely source of the fault on the network.

18. A signal processing electronic device according to claim 15, the at least one processing unit being further configured to:
    populate a geographically-accurate map with a geographic location of a network component determined to be the most likely source of the fault, a geographic location of each the terminal network elements impacted by the network fault, and a diagnostic alarm identifying the network fault.

19. A signal processing electronic device according to claim 15, the at least one processing unit being further configured to:
    monitor performance parameters including at least one of a downstream signal-to-noise ratio, an upstream signal-to-noise ratio, an absolute and delta downstream power level, an absolute and delta upstream power level, an upstream echo level, a downstream micro-reflection level, an upstream filter coefficient ratio, a carrier-to-noise ratio, and a modulation error ratio.

20. At least one non-transitory computer readable storage medium having computer program instructions stored thereon that, when executed by at least one processor, cause the at least one processor to perform the following operations:
    monitor a plurality of different performance parameters for unacceptable threshold levels via communications with a set of terminal network elements on a network;
    separately analyze each one of the plurality of different performance parameters identifying unacceptable threshold levels to identify potential network fault locations on the network;
    generate a plurality of priority rankings of potential network fault locations, each of the plurality of priority rankings associated respectively with a most likely estimated fault location, and each of the plurality of priority rankings being determined from a different one of the plurality of different performance parameters identifying unacceptable threshold levels; and
    combine information of each of the plurality of priority rankings to generate an overall priority ranking of potential network fault locations, wherein the overall priority ranking is associated with at least a highest priority inspection point, and wherein to generate the overall priority ranking further includes to estimate that one of the potential network fault locations is a most likely source of a fault on the network, and to identify said most likely source of a fault on the network as being the highest priority inspection point.

* * * * *